(12) United States Patent
Zhang et al.

(10) Patent No.: US 10,699,135 B2
(45) Date of Patent: Jun. 30, 2020

(54) AUTOMATIC LOCALIZATION GEOMETRY GENERATOR FOR STRIPE-SHAPED OBJECTS

(71) Applicant: HERE Global B.V., Eindhoven (NL)

(72) Inventors: Qilin Zhang, Chicago, IL (US); Xiang Ma, Lisle, IL (US); Xin Chen, Evanston, IL (US); Sanjay Sood, Evanston, IL (US); Mark Tabb, Chicago, IL (US); Chen Luo, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 137 days.

(21) Appl. No.: 15/818,230

(22) Filed: Nov. 20, 2017

(65) Prior Publication Data

US 2019/0156128 A1 May 23, 2019

(51) Int. Cl.
*G06K 9/00* (2006.01)
*G06K 9/62* (2006.01)
(Continued)

(52) U.S. Cl.
CPC ....... *G06K 9/00798* (2013.01); *G05D 1/0212* (2013.01); *G06K 9/4609* (2013.01);
(Continued)

(58) Field of Classification Search
CPC .......... G01C 21/34; G05D 1/0212; G05D 2201/0213; G06K 9/00798; G06K 9/4609; G06K 9/6256; G06K 9/6274; G08G 1/167
See application file for complete search history.

(56) References Cited

U.S. PATENT DOCUMENTS

| 8,209,120 B2 | 6/2012 | Breed |
| 9,081,385 B1 | 7/2015 | Ferguson et al. |

(Continued)

FOREIGN PATENT DOCUMENTS

| DE | 102015007299 A1 | 12/2015 |
| EP | 3171292 A1 | 5/2017 |

(Continued)

OTHER PUBLICATIONS

PCT Written Opinion of the International Examination Report dated Feb. 19, 2019, for corresponding PCT/US2018/058895.
(Continued)

*Primary Examiner* — Manuchehr Rahmjoo
(74) *Attorney, Agent, or Firm* — Lempia Summerfield Katz LLC

(57) ABSTRACT

Apparatus and methods are described for generating geometries for stripe-shaped objects. An image is identified that includes a roadway having one or more stripe-shaped objects. The stripe-shaped objects may include lane lines for road edges or lanes of the roadway. The stripe-shaped objects may include a barrier. At least one targeted region within the image is determined. The at least one targeted region is shaped to intersect the one or more stripe-shaped objects and includes a plurality of pixels. An image analysis is performed on the image to determine when the at least one target region includes a pixel in common with the one or more stripe-shaped objects. A geometry is constructed using the pixel in common. The geometry may be used to update a map or subsequently perform localization.

19 Claims, 27 Drawing Sheets

(51) Int. Cl.
  *G05D 1/02* (2020.01)
  *G06K 9/46* (2006.01)
  *G08G 1/16* (2006.01)
  *G01C 21/34* (2006.01)

(52) U.S. Cl.
  CPC ......... *G06K 9/6256* (2013.01); *G06K 9/6274* (2013.01); *G08G 1/167* (2013.01); *G01C 21/34* (2013.01); *G05D 2201/0213* (2013.01)

(56) References Cited

U.S. PATENT DOCUMENTS

| | | |
|---|---|---|
| 2011/0170744 A1 | 7/2011 | Malinovskiy |
| 2016/0031450 A1 | 2/2016 | Wilson |
| 2016/0325753 A1 | 11/2016 | Stein et al. |
| 2017/0039436 A1 | 2/2017 | Chen et al. |
| 2017/0122762 A1* | 5/2017 | van der Molen ...... G01C 21/32 |
| 2018/0181817 A1* | 6/2018 | Yan ...................... G06N 3/02 |
| 2018/0307234 A1* | 10/2018 | Zhu ...................... G05D 1/0246 |

FOREIGN PATENT DOCUMENTS

| | | |
|---|---|---|
| WO | WO2015189375 A2 | 12/2015 |
| WO | WO2016118672 A2 | 7/2016 |
| WO | WO2017021474 A1 | 2/2017 |

OTHER PUBLICATIONS

Huang; et al. "Fusion Based Holistic Road Scene Understanding", Dept. of Information Science and Electronic Engineering, Zhejiang University, pp. 1-14, Jun. 29, 2014.

Assidiq, Abdulhakam AM, et al. "Real time lane detection for autonomous vehicles." 2008 International Conference on Computer and Communication Engineering. IEEE, 2008. (pp. 82-88).

PCT Written Opinion of the International Examination Report dated Feb. 19, 2019, for corresponding PCT/US2018/0588985.

* cited by examiner

AUTOMATIC LOCALIZATION GEOMETRY GENERATOR FOR STRIPE-SHAPED OBJECTS

FIELD

The following disclosure relates to detection of stripe-shaped objects, map updates based on the detected stripe-shaped objects, automatic localization geometry based on the detected stripe-shaped objects, and navigation systems and/or driving assistance systems based on the automatic localization geometry.

BACKGROUND

Map databases may be used to provide navigation based features such as routing instructions for an optimum route from an original location to a destination location and map based features such as section and display of maps to manually locate locations or points of interest. Map databases are used in driver assistance systems or driverless systems, or autonomous driving systems.

Conventional procedures for map building are resource intensive. It requires human operators as map coders to manually pinpoint control points (e.g., vertices of polylines) to accurately localize every relevant map objects on or near road surfaces. The amount of human input efforts increases dramatically with higher resolution maps with higher definition requirements. Higher definition maps mean more pixels are included for the same objects. Driving assistance systems (e.g., autonomous cars, self-driving autopilot systems) require higher definition maps to ensure driver/pedestrian safety. For these high definition map applications, conventional map coding procedures are neither cost efficient nor turnaround optimized.

SUMMARY

In an embodiment, a method for automatic localization geometry generation for stripe-shaped objects includes identifying an image including a roadway having one or more stripe-shaped objects, determining, using a processor, at least one targeted region within the image, wherein the at least one targeted region is shaped to intersect the one or more stripe-shaped objects and overlaps a plurality of pixels in the image, and performing, using the processor, an image analysis on the image to determine when the at least one target region having the plurality of pixels includes a pixel in common with the one or more stripe-shaped objects.

In an embodiment, an apparatus for automatic localization geometry generation for stripe-shaped objects includes a database and a localization geometry generator. The database is configured to store an image including a roadway having one or more stripe-shaped objects. The localization geometry generator is configured to determine at least one targeted region within the image, wherein the at least one targeted region is shaped to intersect the one or more stripe-shaped objects and includes a plurality of pixels and configured to perform an image analysis on the image to determine when the at least one target region includes a pixel in common with the one or more stripe-shaped objects.

In another embodiment, a method comprises detecting a position of a mobile device, accessing a three-dimensional map in response to the position of the mobile device for one or more stripe-shaped objects, wherein the one or more stripe-shaped objects in the three-dimensional map is derived from at least one targeted region shaped to intersect the one or more stripe-shaped objects, and generating a driving assistance message in response to the one or more stripe-shaped objects.

In another embodiment, an apparatus includes a sensor configured to detect a position of a mobile device and a controller configured to access a three-dimensional map in response to the position of the map device for one or more stripe-shaped objects, wherein the one or more stripe-shaped objects in the three-dimensional map is derived from at least one targeted region shaped to intersect the one or more stripe-shaped objects, the controller further configured to generate a driving assistance message in response to the one or more stripe-shaped objects.

BRIEF DESCRIPTION OF THE DRAWINGS

Exemplary embodiments of the present invention are described herein with reference to the following drawings.

DETAILED DESCRIPTION

Figure 1A:
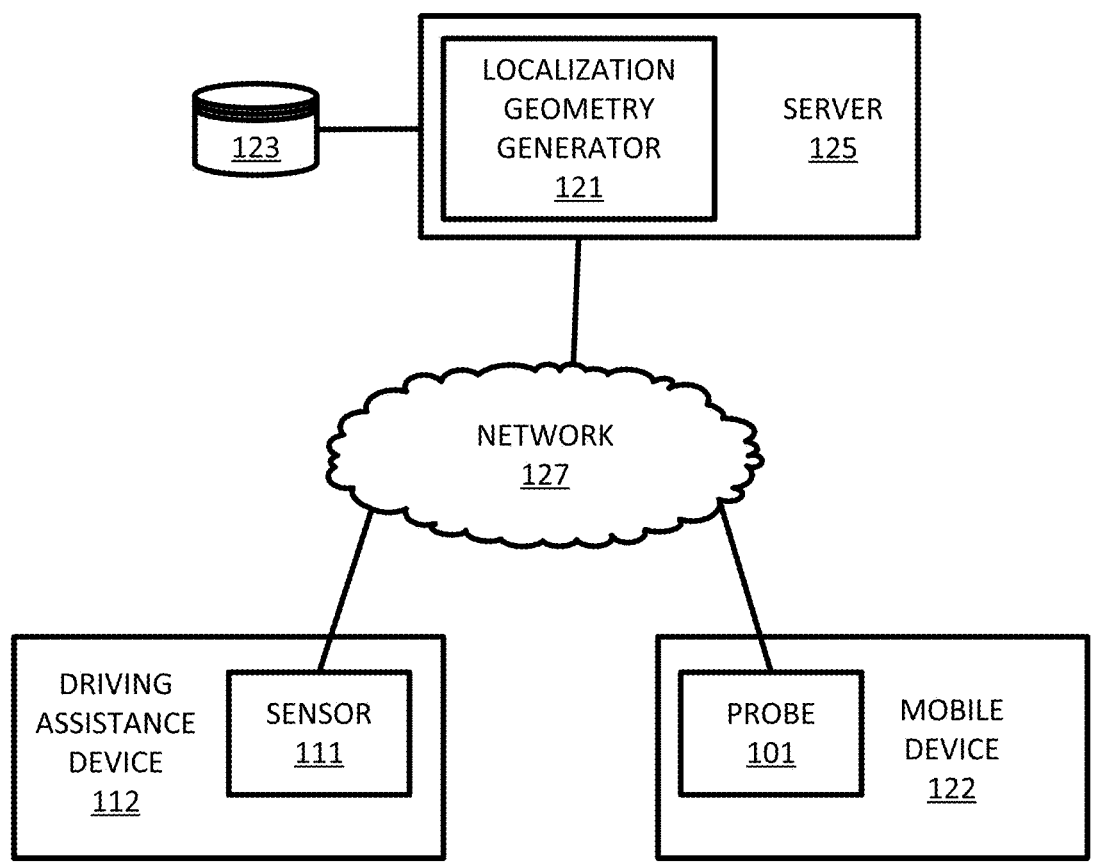
FIG. 1A illustrates an example system for localization geometry generation.

A vehicle may be equipped with one or more environment sensors (e.g., a camera sensor array, light detection and ranging (LiDAR)) configured to detect surroundings of the vehicle, and more specifically, detect one or more objects such as stripe-shaped objects in the vicinity of the vehicle. The stripe-shaped object may include lane markings or road adjacent structures such as guardrails or barricades.

The stripe-shaped object may be continuous or semi-continuous. A continuous stripe-shaped object continues along the roadway for at least a predetermined distance. A semi-continuous stripe-shaped object continues along the roadway in intervals (e.g., predetermined intervals such as dashed lane markers). For examples, road edge lane markers may be continuous along roadways except at intersections, dashed lane markers between lanes of the roadway may be semi-continuous, and guardrails or barricades may run along the roadway in varying distances.

The stripe-shaped object may be defined according to shape, direction, perspective, or any combination thereof. The shape of the stripe-shaped object may be longitudinal having one dimension that is substantially longer than the other dimension. Substantially longer may be defined as ten times or more (e.g., the longer dimension of the stripe-shaped object in the two-dimensional image is ten times or greater than the shorter dimension of the stripe-shaped object in the two-dimensional image). The stripe-shaped object defined by direction may be parallel or substantially parallel to a roadway. The term substantially parallel may be defined within a predetermined angle (e.g., plus or minus 20 degrees) to the roadway. The stripe-shaped object defined by perspective may be in a direction towards a vanishing point of the image. The vanishing point is an abstract point on the image plane where the two-dimensional reorientation of parallel lines appears to converge in the distance. Multiple stripe-shaped objects in the image may have a directional vector that converge to the same direction point or vanishing point.

The following embodiments includes techniques for using one or more stripe-shaped objects for localizations or map updates. In map updates, the location of the stripe-shaped object is detected and added to a high definition map and defined according to a reference geographical location. In localization, a position is determined based on a detected stripe-shaped object based on the known reference location for the stripe-shaped object. The geometry for the stripe-shaped object is automatically calculated based on a machine learned algorithm using a region of interest determined according to the relationship between the stripe-shaped object and the roadway from which the sensor data is collected. The region of interest is a fraction of the total image.

Because the following embodiments perform all aspects of the localization and/or map updates automatically, both computer and human resources are conserved. Human resources are conserved because there is no requirement of human intervention in identification of the stripe-shaped objects. Conventional techniques require a massive amount of manual labeling work in high definition map building, especially localizing the stripe-shaped objects (e.g., lane/road boundaries, barrier/guardrail) in limited access roads. In addition, computer resources are conserved because only the region of interest determined according to the relationship between the stripe-shaped object and the roadway is used in calculating the geometry and the region of interest is a small fraction of the image. The disclosed embodiments include an improvement to the computer technology of map building because the process of calculating the geometry of the stripe-shaped object, and accordingly localization or map updated based on the stripe-shaped object, is more efficient.

In addition, problems with lane marking detection systems using only light detection and ranging (LiDAR) are overcome. The LiDAR only systems are highly susceptible to calibration errors in the LiDAR intensities. When the LiDAR intensity is not well calibrated (or simply high intensity points are mostly coming from grass or other extraneous objects and not from lane painting lines), then the lane marking detection from LiDAR is often incorrect. In the following embodiments, image-based detection does not rely on LiDAR intensity calibration. Thus, when the LiDAR intensity is badly calibrated, the following embodiments still produce good results for lane marking geometry generation.

In addition, LiDAR only systems are negatively affected by traffic occlusions (e.g., a vehicle physically located between the collection device and the lane marking when the LiDAR data is collected). When there is a traffic occlusion, the LiDAR only detector may detect lane line or road boundary on the edge of occlusion instead, resulting in inaccurate detections. In the following embodiments, deep-learning based detectors do not suffer, or at least suffer much less, from errors from lane line occlusions. Thus, the precision of detection is always very high and few wrong detections are made.

FIG. 1A illustrates an example system for localization geometry generation, which may be used for localization or map updates. In FIG. 1A, one or more mobile device 122 include probes 101 and are connected to the server 125 though the network 127 and one or more driving assistance devices 112. The driving assistance device 112 and the mobile device 122 may be embodied by a single device (e.g., a vehicle navigation system). A database 123, including the map, is also connected to the server 125. The database 123 and the server 125 make up a developer system. The server 125 may include a localization geometry generator 121. Multiple mobile devices 122 are connected to the server 125 through the network 127. The mobile device 122 may serve as probes 101 or be coupled with probes 101. The mobile device 122 includes databases corresponding to vehicle maps, which may include data for a subset of the server map for a geographic area based on the current location of the mobile device 122. Additional, different, or fewer components may be included.

In FIG. 1A, the probe 101 collects data used to train localization geometry generator 121. The probe 101 and sensor 111 may be the same or different devices. The term probe 101 may designate the collection of data for the initial analysis or training of the localization geometry generator 121 as well as utilizing the localization geometry generator 121 for map updates, while the term sensor 111 may designate the collection of subsequent data for localization using the localization geometry generator 121. The probe 101 may include any combination of an optical distance system such as light detection and ranging (LiDAR), an image capture system such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

Figure 2:
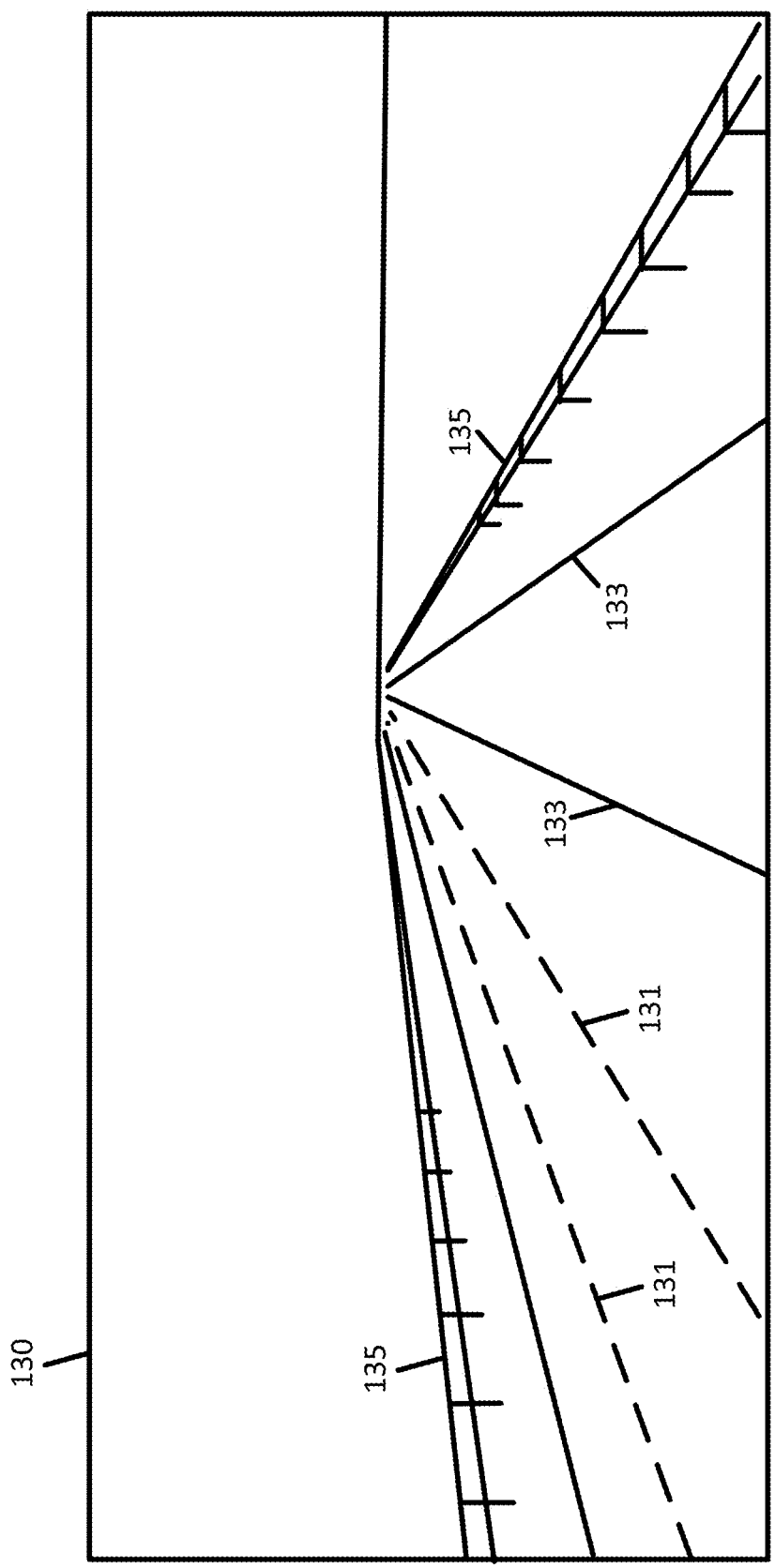
FIG. 2 illustrates an example roadway image or sensor data including stripe-shaped objects corresponding to the localization geometry.

FIG. 2 illustrates an example roadway image 130, which may be another type of sensor data besides image data, including stripe-shaped objects corresponding to the localization geometry. FIG. 2 is a representation of the data collected by probe 101 traveling along a roadway. The data includes representations for any combination of dashed lines 131, solid lines 133, and guardrails 135 or barricades. A barricade, or barrier, is a temporary structure used to define a construction area or separate a portion of the roadway. A guardrail is a type of fence that runs alongside the roadway to mitigate damage in accidents (e.g., vehicles veering off the roadway). The lane markings are road surface indicia, which may comprise paint applied to the road surface (i.e., paint on concrete or asphalt). The road surface indicia may be applied using decals or plastic sheets applied to the road surface with adhesive. The road surface indicia may have reflectivity or retereoflectivity properties that cause the lane markings to reflect light differently that the surrounding road surface. For example, the road surface indicia may minimize the scattering of reflected light back to the source of the light. The lane markings may include a plastic reflector or retroreflector that is secured to the road surface or mounted in concrete or asphalt to be flush with the road surface. In a retroreflector, a wave (e.g., electromagnetic wave) is reflected back to the source along a vector that is parallel to but opposite in direction from the source.

The mobile device 122 sends the roadway image 130 including one or more stripe-shaped objects to the server 125. The roadway image 130 may be stored in memory and the server 125 may identify the stored image and access the stored image from memory.

Figure 3:
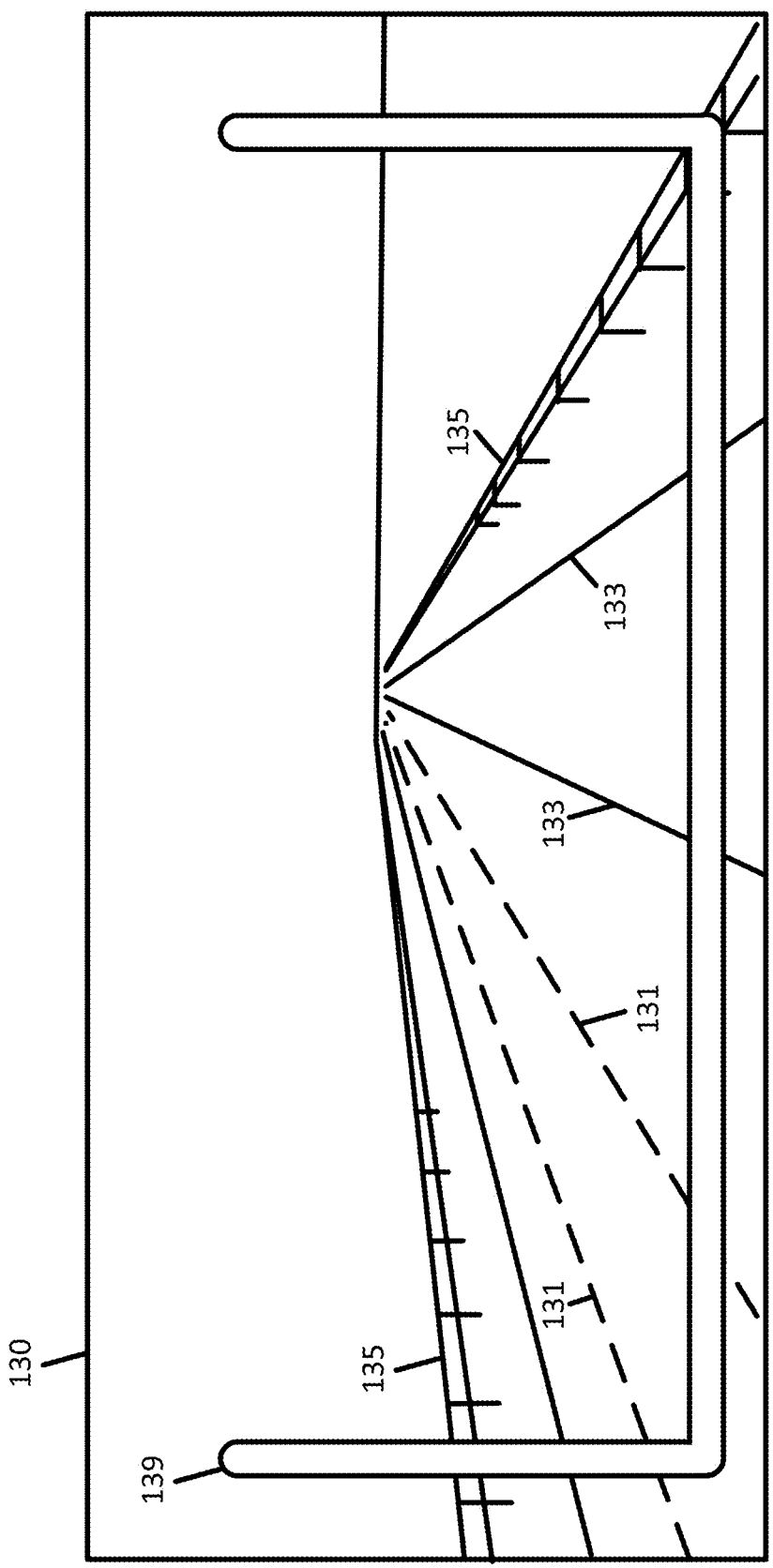
FIG. 3 illustrates the example roadway image or sensor data with an overlaid targeted region.

The server 125 determines at least one targeted region 139 within the image. The targeted region 139 is shaped to intersect the one or more stripe-shaped objects. For example, the targeted region 139 may be U-shaped (shaped like the letter U). FIG. 3 illustrates the example roadway image 130 or sensor data with targeted region 139, which is U-shaped.

A U-shape may have three components. A first component is adjacent to and substantially perpendicular to a second component, which is adjacent to and substantially perpendicular to a third component. The term adjacent to may be bordering or next to one another. The term substantially perpendicular may be orthogonal or within a predetermined angle (e.g., 10 or 20 degrees) to orthogonal. Alternatively, the targeted region 139 may be another shape such as V-shaped. A V-shaped may have two components. A first component is adjacent to and at a predetermined angle with a second component. The predetermined angle may be any value between 45 degrees and 135 degrees (e.g., 60 degrees, 90 degrees, 110 degrees). The predetermined angle may be centered about a vertical in the roadway image 130 such that the V is opened in the up direction (i.e., opposite the direction of gravity).

As the mobile device 122 travels along the roadway, objects appear in different positions in the roadway image 130 or other type of sensor data. Objects may scroll, or move, from the distant locations along the roadway to closer locations in the foreground of the roadway image 130. As the probe 101 collects multiple instances of the roadway image 130, all objects, to a certain extent pass by or intersect with the targeted region 139. Thus, the shape of the stripe-shaped object, which is toward the vanishing point in the roadway image 130, as well as the nature of traveling along the roadway dictates the targeted region 139.

While illustrated as an outline overlaid on the roadway image 130, the targeted region 139 may be a designation of pixels, or other data points when the roadway image 130 is another type of sensor data, as being included in the targeted region 139. The server 125 performs an image analysis on the image to determine when the targeted region 139 includes a pixel in common with one or more stripe-shaped objects. The server 125 may scan the image data or other sensor data in the targeted region 139 to determine when the targeted region 139 overlaps with a stripe-shaped object.

For example, the localization geometry generator 121 may include a specialized computer or processor incorporated into server 125 for performing a learned model or learned algorithm for the identification of stripe-shaped objects by determining when the targeted region 139 includes at least one pixel in common with a stripe-shaped object. An example learned model includes one or more neural networks. The localization geometry generator 121 may execute a neural network such as a convolutional neural network may include multiple layers such as at least one convolutional layer and at least one pooling layer. Other techniques for the image analysis are described in additional embodiments.

As a result of the image analysis, the location of the stripe-shaped object, such as the location of the pixel in common is stored by the server 125. The server 125 converts the location of the stripe-shaped object to a three-dimensional model. For example, the pixel location in the two-dimensional roadway image 130 is converted to a high definition map or other three-dimensional model of the space around the roadway.

The high definition map or other three-dimensional model may be updated according to the location of the stripe-shaped object. For example, the stripe-shaped object may be stored as a roadway edge (e.g., solid line), or a boundary between lanes of travel (e.g., dashed line) in the same or different directions in the high definition map or other three-dimensional model.

Subsequently, other devices may access the stripe-shaped object information in the updated high definition map in order to provide driving assistance. For example, the driving assistance device 112, which may be included in a vehicle, may receive location information from sensor 111 in the form of geographic coordinates. The sensor 111 may be GPS or utilize another positioning device technique. The driving assistance device 112 sends the location information to the server 125 via network 127 to receive information from the high definition map including the location of the stripe-shaped object. The driving assistance device 112 provides one or more driving assistance functions to the user or vehicle in response to the location of the stripe-shaped object.

For example, the driving assistance device 112 may provide one or more driving assistance functions in the forms of messages, warnings or commands. The messages may be presented to a user describing the state of the vehicle with respect to the stripe-shaped object. For example, the message may describe the distance between the vehicle and a lane line or the distance between the projected trajectory of the vehicle and a lane line (e.g., whether the projected trajectory of the vehicle intersects a lane line). A warning may be issued to the driver or the vehicle itself. The warning may indicate that the vehicle has crossed a lane line or that the vehicle crossing a lane line is imminent. The warning may indirectly instruct the driver to turn left or right to prevent crossing the lane line. The command may directly instruct the driver to turn left or right or adjust speed to prevent crossing the lane line. The command may be a driving command that instructs the vehicle to turn left, turn right, adjust speed, or brake, in response to the position of the stripe-shaped object.

Figure 1B:
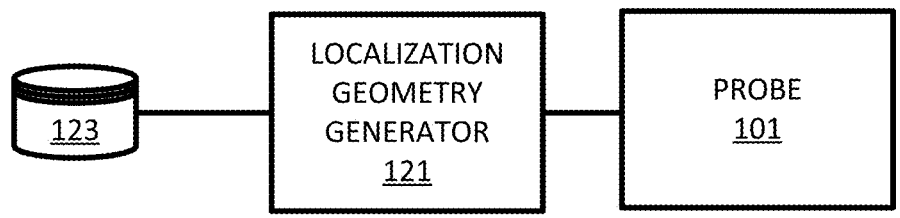
FIG. 1B illustrates another example system for localization geometry generation.

FIG. 1B illustrates another example system for localization geometry generation. In FIG. 1B, data collected by probe 101 is sent to the localization geometry generator 121 and the calculated geometries are added to geographic database 123. Additional, different, or fewer components may be included.

The probe 101 collects sensor data (e.g., roadway image 130). The sensor data is sent to the localization geometry generator 121, which may access the sensor data from memory or otherwise identify the sensor data including a roadway having one or more stripe-shaped objects. The localization geometry generator 121 determines at least one targeted region within the image. The targeted region is predefined. The targeted region has a shape with a high probability that the targeted region will intersect the one or more stripe-shaped objects and includes a plurality of pixels. The targeted region is shaped to intersect with objects that move from the foreground to the background in a series of images or sensor data collected as the probe 101 travels along the roadway.

The localization geometry generator 121 is further configured to perform an image analysis on the image to determine when the at least one target region includes a pixel in common with the one or more stripe-shaped object templates, which identifies the stripe-shaped object in the targeted region. The localization geometry generator 121 may trace an outline of the stripe-shaped object based on the pixels that are identified as matching a stripe-shaped object template. The outline of the stripe-shaped object is a geometry that may be stored in geographic database 123. Geometries in the geographic database may be used for localization. That is, when the stripe-shaped object is subsequently detected by another device, the known location of the stripe-shaped object is used to determine the location of the device.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The vehicle may also include a communication device. The vehicle may include an integrated communication device coupled with an in-dash navigation system. The vehicle may include an ad-hoc communication device such as a mobile device or smartphone in communication with a vehicle system. The communication device connects the vehicle to a network including at least one other vehicle and at least one server. The network may be the Internet or connected to the Internet. The server includes a server map. The server map includes road segments representative of roadways or other pathways, which are linked together at nodes. The server map includes locations names and points of interest at particular geographic locations or location along a road segment.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

Figure 4:
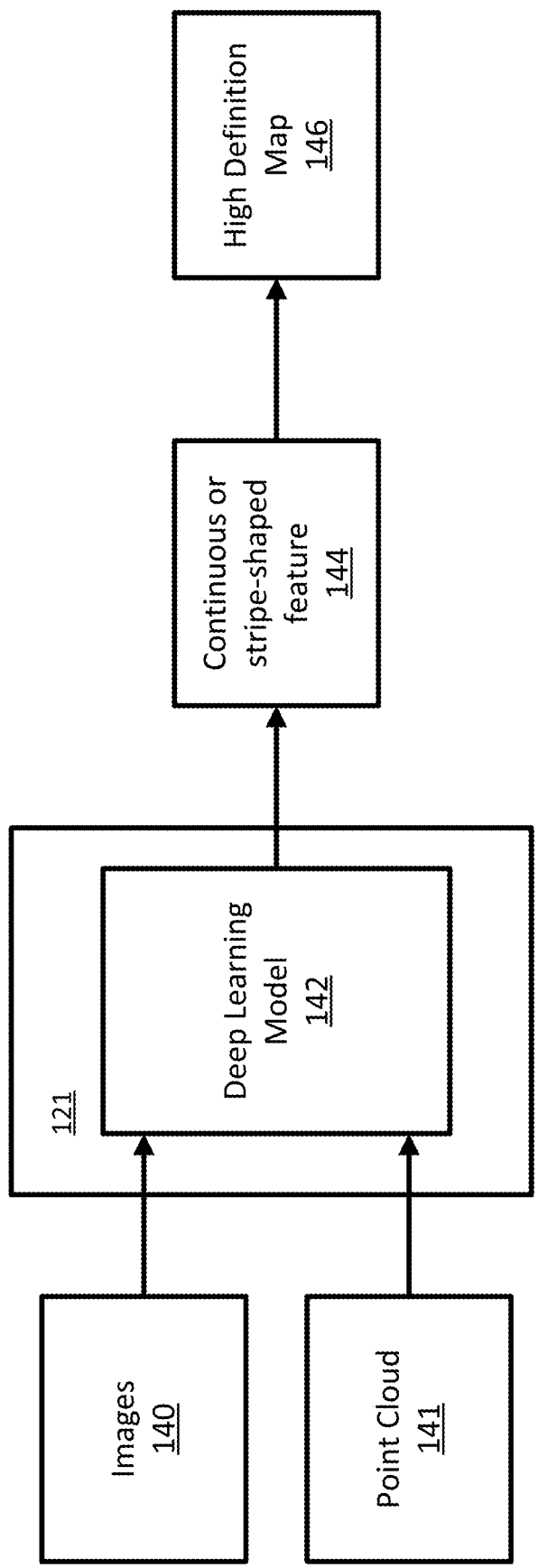
FIG. 4 illustrates an example block diagram for building a high definition map including the automatically generated localization geometry.

FIG. 4 illustrates an example block diagram for building a high definition map including the automatically generated localization geometry. The block diagram includes images 140 and point cloud 141, a deep learning model 142, a continuous or stripe-shaped feature 144, and a high definition map 146. The deep learning model 142 may be a component of the localization geometry generator 121. Additional, different, or fewer components may be included.

The images 140 may include a series of images, or another type of sensor data, collected at a series of times and a series of locations. For example, the images 140 may be collected by a camera or a charge coupled device (CCD) that is traveling along the roadway. The camera may be a visible spectrum camera, an infrared camera, an ultraviolet camera or another camera.

The camera may be mounted on a vehicle driven along the roadway. Each image in the series of images may be stored with a timestamp and/or a location stamp based on the time and location that the image was collected. In another example, the images may be collected in response to time intervals (e.g., every 0.5 second, every second) as the vehicle travels along the roadway such that the series of images are at a predetermined time interval. In this example, the geographic distance between images varies as the speed of the camera or collection vehicle changes. The timestamp may be omitted when the images are collected at the predetermined time interval. In another example, the images may be collected in response to location intervals (e.g., every meter, every 10 feet) as the vehicle travels along the roadway such that the series of images are at a predetermined location interval. In this example, the time between images varies as the speed of the camera or the collection vehicle changes. The location stamp may be omitted when the images are collected at the predetermined location interval.

The point cloud 141 may include data points that derived from distancing devices such as LiDAR, SONAR, or RADAR devices. The point cloud 141 may comprise three-dimensional data points including in a coordinate system such as (x, y, z) or (latitude, longitude, altitude). The point cloud 141 may be measured in distances and angles between the object described by the points in the point cloud to the collection device. In this example, the data points may be described as (distance, angle1, angle2). The angles may be measured from a set of axes. For example, angle1 may be measured from a horizontal axis intersecting with the position of the collection device and angle2 may be measured from a vertical axis intersecting the position of the collection device.

The images 140 and the point cloud 141 may be stored in memory and accessed by the deep learning model 142. The image 140 and the point cloud 141 may be selected based on collection location. The deep learning model 142 may analyze the sets of images and point clouds according to associated road segments making up a roadway. The deep learning model initialize the process by identifying an image and corresponding point cloud including the roadway having one or more stripe-shaped objects.

The deep learning model 142 may perform a three phase algorithm for stripe-shaped object geometry detection. The three phase algorithm may include (1) per-image detection, (2) line connection, and (3) post processing.

In per image detection, images are analyzed individually at locations for targeted regions within the images based on scanlines. A neural network may analyze the entire image, a substantial portion of the image, or a roadway portion of the image in order to determine whether or not the targeted region, or a portion of the targeted region depicts a stripe-shaped object. Substantially all of the image may be defined as a predetermined percentage (e.g., 80% or 90% of the image). The roadway portion of the image may include the portion of the image that depicts the roadway or the portion of the image that depicts area adjacent to the roadway within a predetermined distance (e.g., a predetermined number of pixels or a predetermined distance based on the pixel to geographic distance resolution of the image). The roadway portion of the image may include both the portion that depicts the roadway and the area adjacent to the road.

Initially, the neural network may be trained using ground truth locations of one or more stripe-shaped objects in. The ground truth includes a set of images including images with at least one stripe-shaped object and images with no stripe-shaped objects. The ground truth may be determined by inspecting the images and selecting the locations of the stripe-shaped objects. The ground truth may include a set of data that associated images using an image identifier with pixel coordinates for the locations of the stripe-shaped objects.

The set of training images with ground truth location applied to the neural network may comprise polylines. A polyline is a continuation line composed of one or more straight line segments. There are two or more endpoints or vertices in a polyline. The vertices or endpoints are the end of one segment and beginning of the next. Adjacent segments in the polyline may be in different directions. The set of training images includes a polyline based labeling format for both continuous and semi-continuous striped-shaped objects. The polyline based labeling defines the ground truth by human labelers.

Figure 5:
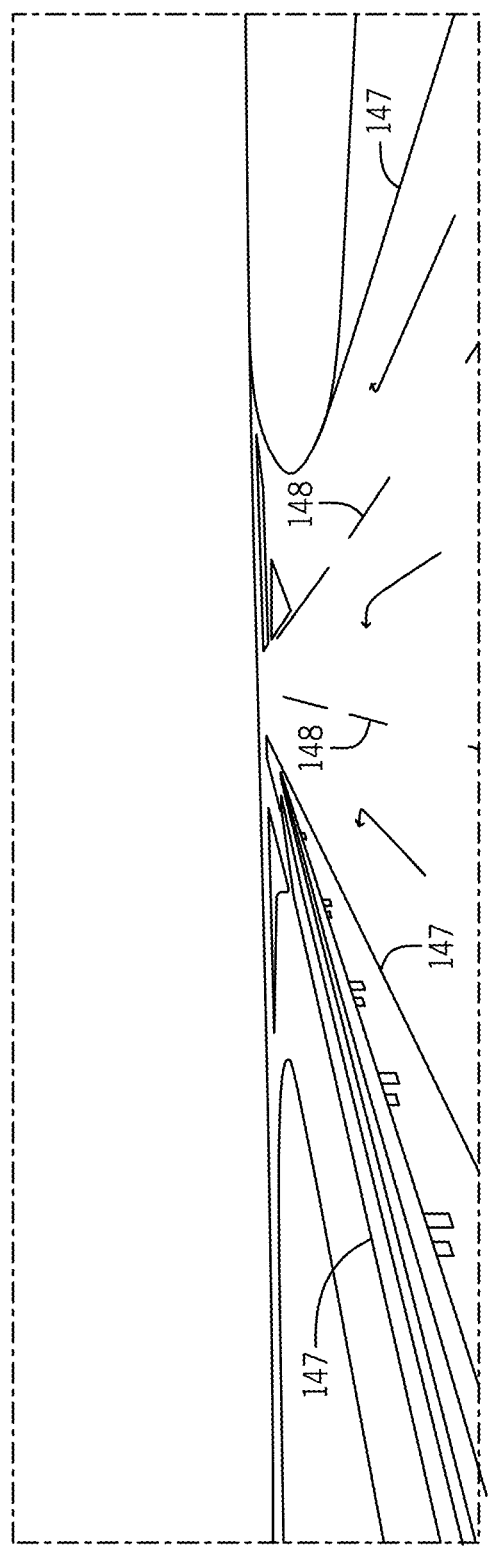
FIG. 5 illustrates an example for polyline labeling for training a deep learning model.

FIG. 5 illustrates an example for polyline labeling for training a deep learning model. A polyline 147 passes through the center of a continuous object (e.g., solid lane line) and a polyline 148 passes through the center of a semi-continuous object (e.g., a dash lane line). That is, polyline 147 represents the solid lane line at the edge of a road, and the polyline 147 extends for a distance along the road, and a polyline 148 represents the dash line internal to the road, and the second polyline 148 extends for the same distance along the road, even though the dashes making up the dash lane line have spaces between them. Although polyline 147 represents a continuous striped-shaped object and polyline 148 represents a semi-continuous stripe-shaped objects, both polylines 147 and 148 are continuous. This process of labeling using polylines is a less labor intensive technique for the human labelers when establishing ground truth. This technique also speeds up and improves the efficiency of training the neural network or other deep learning model.

In addition, using the polyline technique large scale data augmentation with simultaneous image-label transform is attainable. Data augmentation is defined as the preprocessing step of training deep learning models such as neural networks, which is used to increase the number of training samples. For example, regular data augmentation typically involves image cropping, left-right side mirroring, and image rotations, but their corresponding labels remained unchanged. However, the training process of the convolutional neural network includes large scale data augmentation with simultaneous image and label transform. All labels are in polyline format, which may be stored in a series of x-y coordinate values pairs of the polyline vertices. While the image data itself is rotated, or mirrored or cropped, the x-y coordinate value pairs are updated to reflect these transforms. This simultaneous image-label transform method ensures the correctness of the augmented training data.

Coefficients or other parameters for the neural network are stored through training the neural network. The neural network may include multiple layers, and different coefficients may be applied to different layers. Subsequently, once the neural network has been trained, additional images may be fed to a neural network as an input. The additional images may be at different locations and/or other times than the training images.

The images 140 are applied to the neural network. The neural network analyzes the image systematically through the multiple parameters assigned to the multiple layers of the neural network. The neural network may provide an output for each pixel of the target region or each group of pixels in the target region. For example, the neural network may provide an indication whether each pixel in the target region is a pixel in common with the one or more stripe-shaped objects or overlapping one or more stripe-shaped objects. The neural network may output a list of pixel coordinates for the overlapping region in the target region. The list of coordinates defines a continuous or stripe-shaped feature 144.

Figure 6:
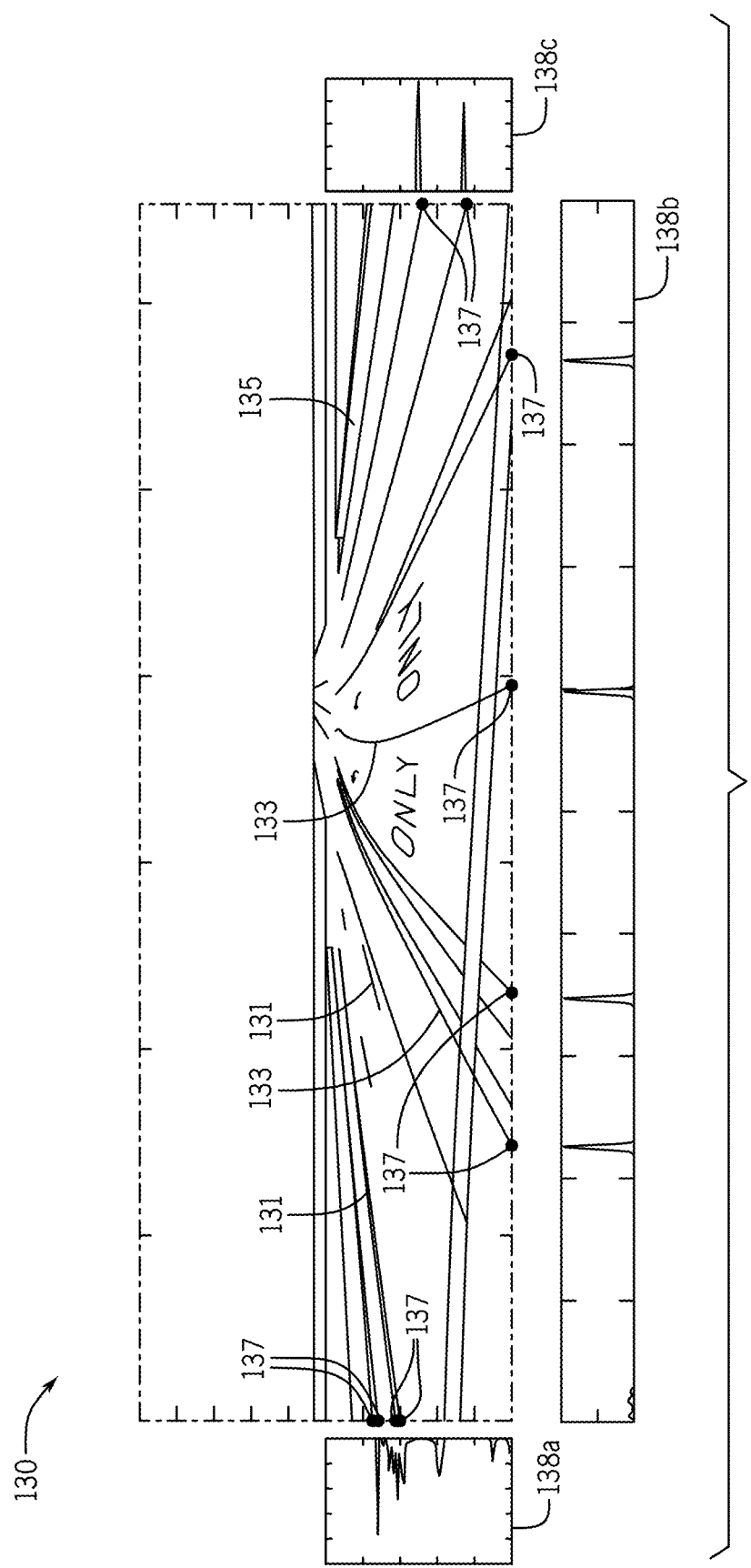
FIG. 6 illustrates example probability maps for example scanlines.

In another embodiment, the deep learning model 142 may output probability values for each of the pixels or group of pixels in the target region. FIG. 6 illustrates an example roadway image 130 and example probability maps for example scanlines on the roadway image 130. While not illustrated, the scanlines are at the borders of the roadway image 30 at the bottom border, the left side border, and the right side border.

The probability map 138a corresponds to the left side border scanline. The probability map 138b corresponds to the bottom side border scanline. The probability map 138c corresponds to the right side border scanline.

The horizontal axis of the probability maps describes a position along the scanline. That is, the horizontal axis describes pixel distances or geographic distances along the scanline in the longitudinal direction of the scanline. The vertical axis of the probability of the probability maps describes a probability that the position or pixel(s) (e.g., row of pixels) along the scanline corresponds to a stripe-shaped object. The pixels that correspond to probable stripe-shaped objects are marked with markers 137. For example, for the left side border scanline, probability map 138a indicates one of the markers 137 at several positions, the probability map 138b indicates markers 137 at four different pixel locations or rows of pixels from that may be measured from the beginning of the scanline (starting at the bottom left of the image) for the bottom border scanline, and the probability map 138c indicates markers 137 at two different pixel locations that may be measured from the beginning of the scanline (starting near the bottom of the image). Within each of the probability maps 138a-c, a local maximum may be calculated as the location of the stripe-shaped object. The local maximum may be determined by comparing adjacent values (e.g., from adjacent images or successive images) and identifying when the local maximum is reached (e.g., one or more increasing values followed by one or more decreasing values). The local maximum may be determined by identifying a zero crossing in the first derivative of the data.

The localization geometry generator 121 may analyze the probabilities from the probability map to determine whether the portions of the scanline are overlapping the stripe-shaped object or have pixel(s) in common with the stripe-shaped object. The localization geometry generator 121 may compare the probabilities to a probability threshold. When the probability from the probability map for a particular pixel or row of pixels exceed the probability threshold, the localization geometry generator 121 designates the particular pixel or row of pixels as overlapping the stripe-shaped object or have pixel(s) in common with the stripe-shaped object. The localization geometry generator 121 may also generate marker 137 in response to the probability exceeding the probability threshold. When the probability is less than the probability threshold, the localization geometry generator 121 does not designate the pixel or row of pixels as a stripe-shaped object. In one example, in addition or as an alternative to the probability threshold, the localization geometry generator 121 may designate pixels for the stripe-shaped object based on local maximums of the probability function. That is, when the probability function includes a peak (a series of increasing values followed by a series of decreasing values), the localization geometry generator 121 designates the pixels or rows of pixels as overlapping the stripe-shaped object.

Figure 7:
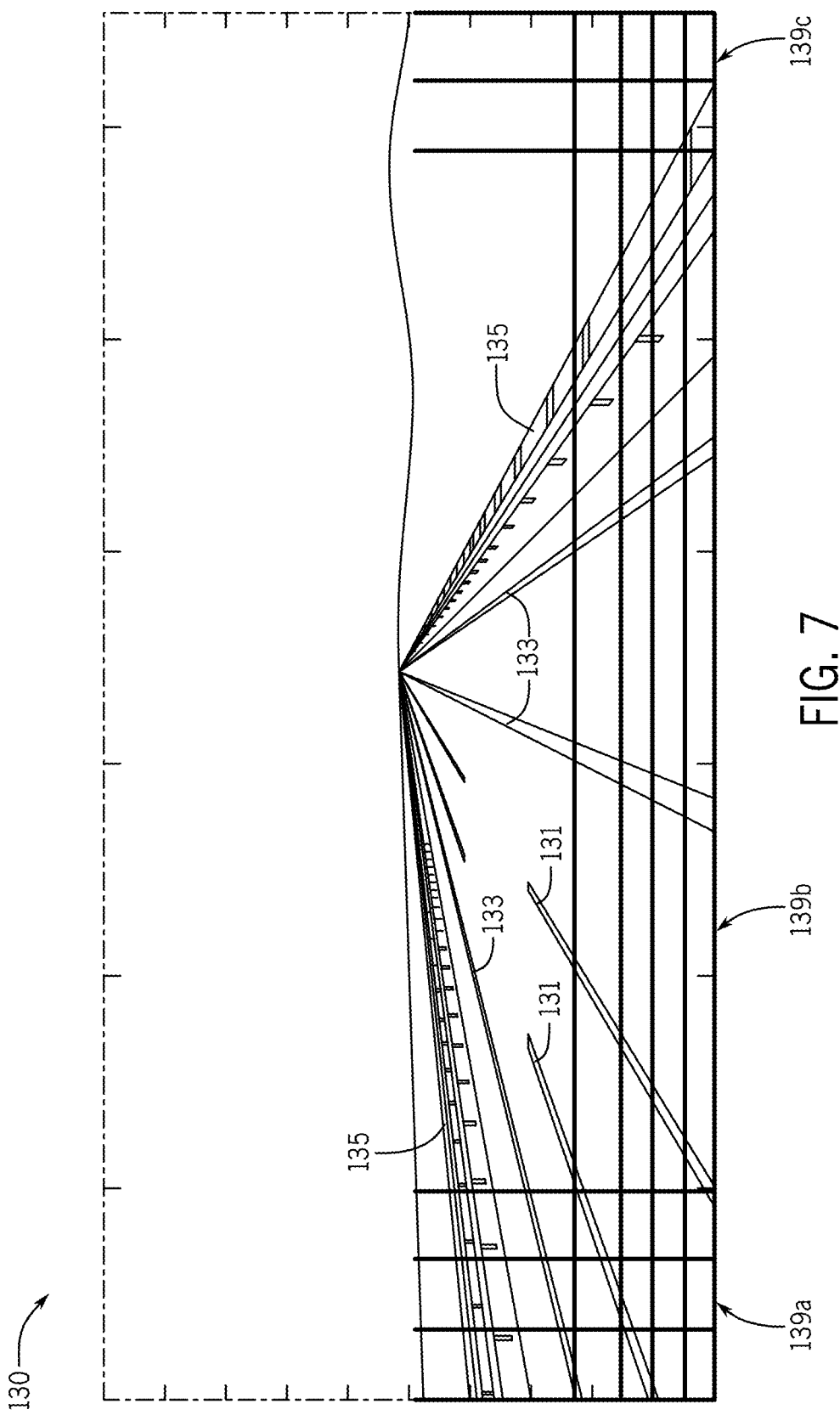
FIG. 7 illustrates example scanlines for an example roadway image.

As an alternative to a single scanline in each direction (left side, bottom and right side), the localization geometry generator 121 may analyze multiple scanlines in each direction. FIG. 7 illustrates example multiple scanlines in each direction for an example roadway image. FIG. 7 depicts a group of four left side scanlines 139*a*, a group of five bottom side scanlines 139*b*, and a group of three right side scanlines 139*c*.

Any number of scanlines may be used for the various groups. For example, eight scanlines may be used for the left side scanlines 139*a*, eight scanlines may be used for the bottom side scanlines 139*b*, and eight scanlines may be used for the three right side scanlines 139*c*. The number of scanlines may be selected based on the speed of the collection vehicle or the time frequency that images are collected. More scanlines may be used for faster collection vehicle speeds or more infrequent image collection. The number of scanlines may be selected based on the type of roadway. For example, the number of scanlines may be determined based on the functional classification of the roadway (e.g., arterial roads are assigned a high number of scanlines, collector roads are assigned a medium number of scanlines, and local roads are assigned a low number of scanlines). Various functional classification systems may be used. One example of a functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size. Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

The number of scanlines may be selected based on the position of the collection vehicle. For example, in a multiple lane roadway, the number of scanlines and/or the number of scanlines used in each group of scanlines, may depend on the lane of travel for the collection vehicle. In a right most lane or near right most lane, the right side group of scanlines may include fewer scanlines and the left side group of scanlines may include more scanlines. In a left most lane or near left more lane, the left side group of scanlines may include fewer scanlines and the right side group of scanlines may include more scanlines. In a center or near center lane, the left and right side groups of scanlines may have the same number of scan lines.

This principle is illustrated by the roadway image of FIG. 7. When the image is collected from the right lane, the right side of the image includes predominately trees and vegetation. Fewer scanlines are necessary to confidently detect stripe-shaped objects in this area. However, then the image is collected from the right lane, the left side of the image may include may stripe-shaped objects, and more scanlines may be preferred to detect stripe-shaped objects.

The scanlines in the groups of scanlines may be spaced apart by a predetermined distance, which may be measured in a number of pixels or a geographical distance. The predetermined distance may be set by a variety of factors.

The predetermined distance may be selected based on the speed of the collection vehicle or the time frequency that images are collected. A smaller predetermined distance may be used for faster collection vehicle speeds or more infrequent image collection. The predetermined distance may be selected based on the type of roadway. For example, the predetermined distance may be determined based on the functional classification of the roadway (e.g., arterial roads are assigned a larger distance between scanlines, collector roads are assigned a medium distance between scanlines, and local roads are assigned a smaller distance between scanlines).

The predetermined distance may be selected based on the position of the collection vehicle. For example, in a multiple lane roadway, the distance between scanlines may depend on the lane of travel for the collection vehicle. In a right most lane or near right most lane, the right side group of scanlines may include a larger distance between scanlines and the left side group of scanlines may include a smaller distance between scanlines. In a left most lane or near left more lane, the left side group of scanlines may include a larger distance between scanlines and the right side group of scanlines may include a smaller distance between scanlines.

Figure 8:
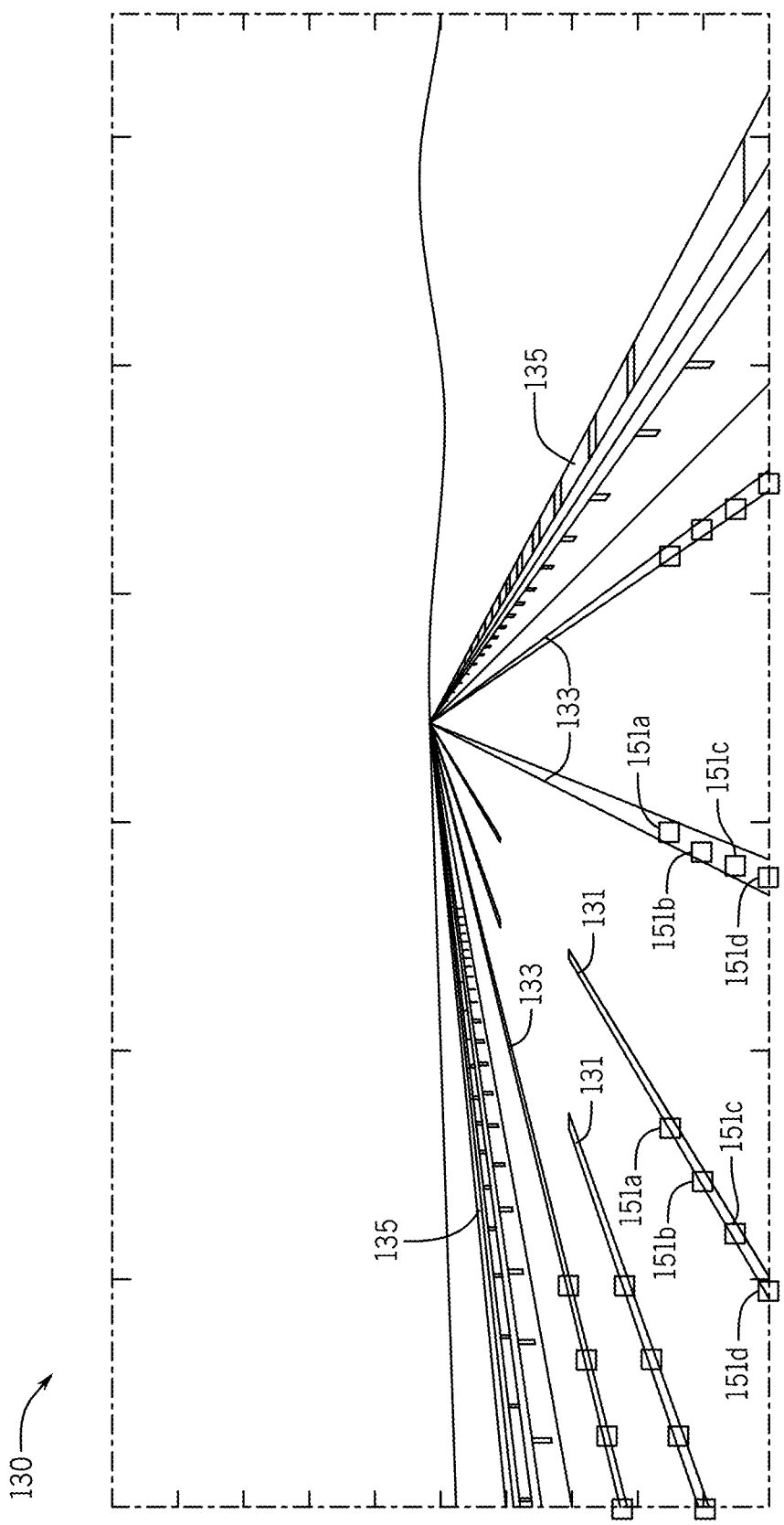
FIG. 8 illustrates an example set of intersection points for the scanlines in the example roadway image.

FIG. 8 illustrates an example set of intersection points for the scanlines in the example roadway image. The localization geometry generator 121 may analyze the results of the multiple scanlines using a variety of techniques. A set of scanlines may include one scanline from the left side scanlines 139*a*, one scanline from the bottom side scanlines 139*b*, and one scanline from the right side scanlines 139*c*.

FIG. 8 illustrates several sets of data points from the sets of scan lines. Data points 151a correspond to a first set of scanlines, data points 151b correspond to a second set of scanlines, data points 151c correspond to a third set of scanlines, and data points 151d correspond to a fourth set of scanlines.

The localization geometry generator 121 may combine the data points 151a-d to construct the geometry for the stripe-shaped object. The localization geometry generator 121 may fit a line to the points. For example, a simple regression technique may average the possible lines constructed from data points 151a-d. Thus, the localization geometry generator 121 identifies an intersection point with the one or more stripe-shaped for each of the scanlines and calculates an average of the intersection points. The localization geometry generator 121 may perform an iterative technique (e.g., called RANdom SAmple Consensus or "RANSAC") to remove outliers from the data points.

The localization geometry generator 121 may perform a least squares technique. The localization geometry generator 121 may calculate offsets from each of the data points 151a-d to at least two hypothetical lines approximating the data points 151a-d. The localization geometry generator 121 compares the sum of the offsets to each hypothetical line. The sum of the offsets may be compared by minimizing the sum of the squares of the distances between the data points 151a-d and the hypothetical lines.

Figure 9:
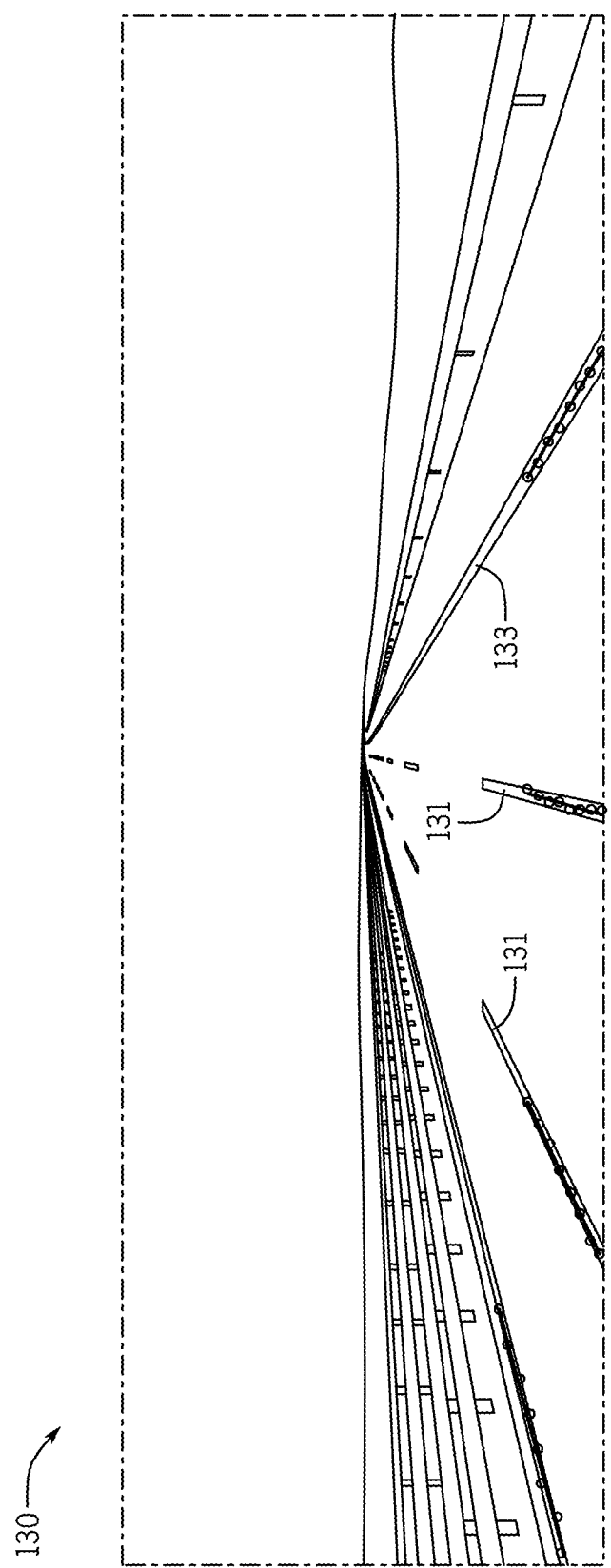
FIG. 9 illustrates an example set of confidence values for the intersection points for the scanlines.

FIG. 9 illustrates an example set of confidence values for the intersection points for the scanlines. The confidence values may describe how well the line fitting technique fits the data points and/or how confident the deep learning model (e.g., neural network) is on the result.

Figure 10:
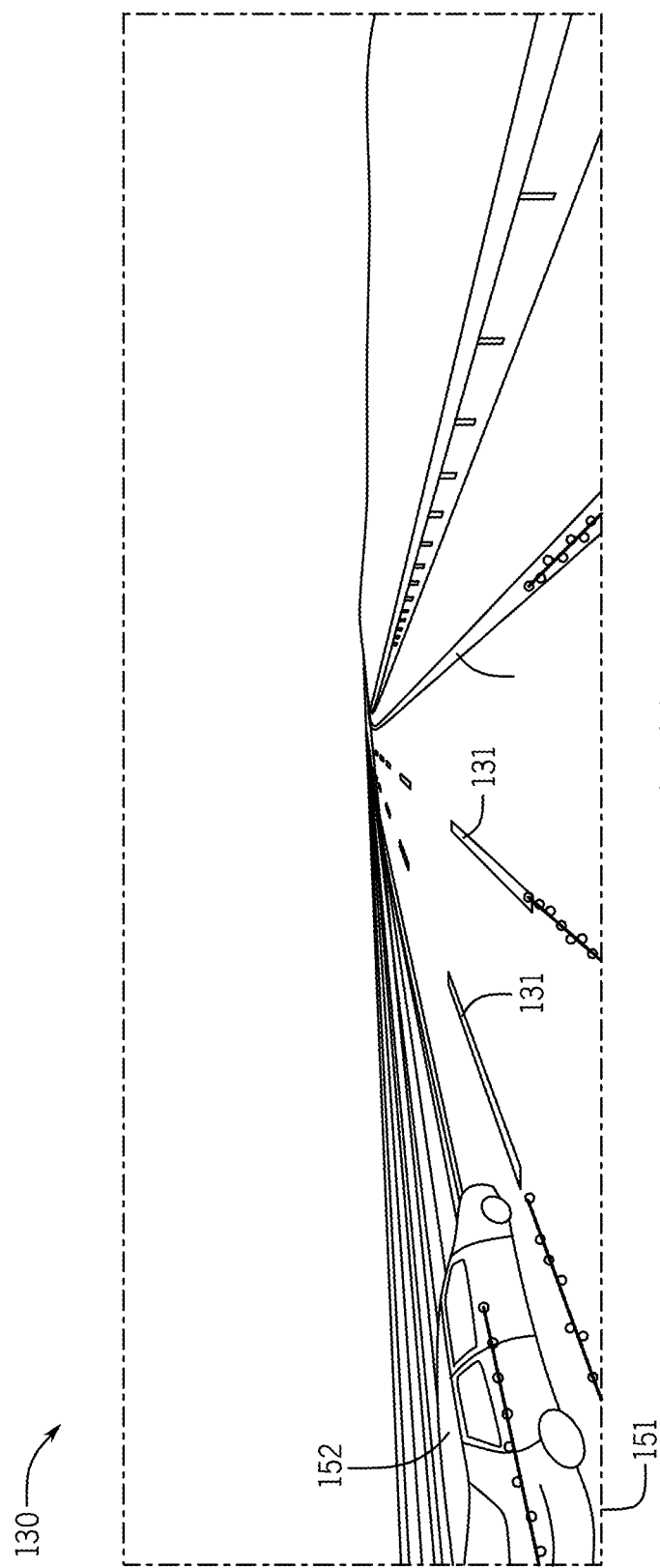
FIG. 10 illustrates an example occlusion in the roadway image.

FIG. 10 illustrates an example occlusion 151 in the roadway image. The occlusion may be another vehicle that is traveling between the collection vehicle and/or camera and some of the lane markings. Even though lane markings 152 are hidden in the image behind the occlusion 151, the localization geometry generator 121 still identifies the locations of the lane markings 152. This is because the entire image, or substantially all of the image or roadway image, is used in the image analysis. Thus, the location of other lane markings suggests to the image analysis that there are lane markings 152 hidden behind the occlusion 151. However, the confidence value for these hidden lane markings may be lower than if the occlusion 151 was not present.

Figure 11:
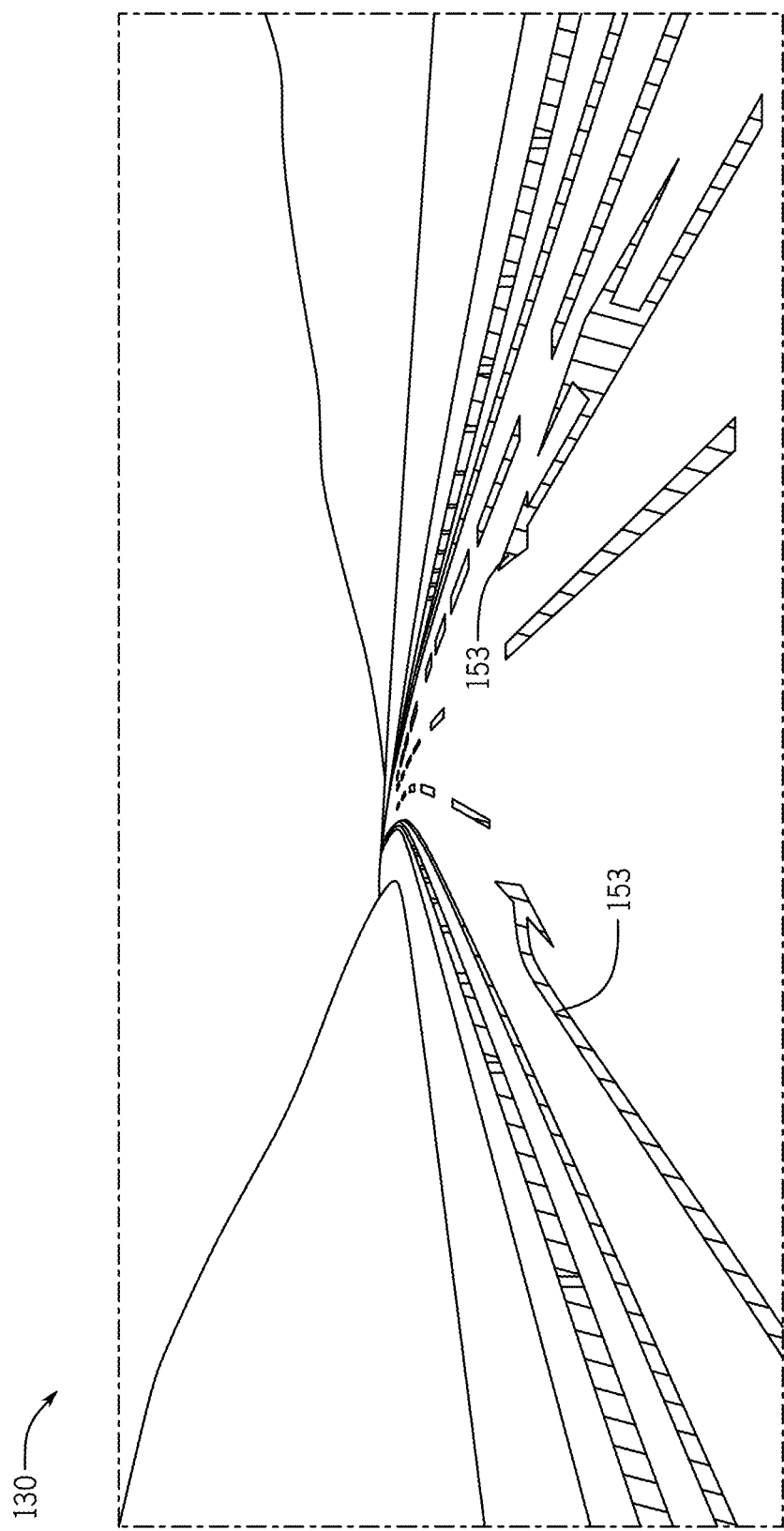
FIG. 11 illustrates an example projection of point cloud data on the roadway image.

In line connection, the results of the deep learning model and/or the line fitting technique are analyzed to modify the stripe-shaped object geometry based on a three-dimensional point cloud. FIG. 11 illustrates an example projection of point cloud data on the roadway image to form shapes 153. The localization geometry generator 121 may calculate a three-dimension polyline by referencing the detected data points or the line fit to the detected data points. The localization geometry generator 121 may project the detected point or line from the two-dimensional image to the three-dimensional point cloud.

The projection may be based on a collaboration between the collection devices. For example, a known three-dimensional location from the collection vehicle is applied to the distance data. For example, consider a point cloud created from LiDAR. The point cloud may be selected based on the geographic position where the image was collected as well as the angle (e.g., up to three angles including roll, pitch, and yaw) of the camera when the image was collected. The localization geometry generator 121 determines at least one point in the point cloud that correlates with the lane marker in the two-dimensional image. The relationship between the three-dimensional point cloud and the two-dimensional image may be described by a matrix. The localization geometry generator 121 identifies other points in the point cloud, based on the first correlated point, that make up an object. The group of points in the point cloud represent similar distances (e.g., within a distance range) from the distance data collection device.

In post processing, the geometry from the localization geometry generator 121 is applied to a high definition map 146. The stripe-shaped object may be stored in association with three-dimensional coordinates. The stored three-dimensional coordinates may define the vertices of the stripe-shaped object or the sides of the stripe-shaped object. The stripe-shaped object may have shape defined by the three-dimensional coordinates.

In another example, the lane markings are applied to the high definition map 146 as predetermined shapes. For example, a dashed lane marking may be defined as a particular line width and length and interval between dashes. A continuous lane marking may be defined as a particular width. A guardrail or barrier may also have predetermined lengths, widths, and heights. To apply the detected lane marking to the high definition map 146, only the location is used. The detected location from the localization geometry generator 121 is stored as a location for one of the predetermined shapes of the lane markings. For each lane marking, an attribute may include the location and lane marking identifier (e.g., 1 for dashed line, 2 for continuous line, and 3 for guardrail). When the high definition map 146 is displayed or accessed the lane marking identifier indicates the predetermined shape that should be applied at that location.

FIGS. 12-19 illustrate example algorithms for performing line connection using the results of the deep learning model to modify the stripe-shaped object geometry based on a three-dimensional point cloud collected from a vehicle. The example algorithms for performing line connection are configured to connect the points from the deep learning model as polylines to represent the geometry of stripe shaped objects. The points outputted from the deep learning model may be referred to as model points, and the points from the three-dimensional point cloud may be referred to as 3D points.

Each of the 3D points may be associated with a timestamp, for example, by the localization geometry generator 121 assigning timestamps to the 3D points. Each of the model points may be associated with a timestamp, for example, by the localization geometry generator 121 assigning timestamps to the model points. The timestamp may be defined as a sequence of numerical digits that records the specific time when the image (e.g., as provided by the deep learning model) or the three-dimensional point cloud (e.g., LiDAR data) is collected. The timestamp may be accurate up to $1/100^{th}$ of a second, $1/1000^{th}$ of a second, or another degree of accuracy. The timestamp may be synchronized between the images and the three-dimensional point cloud using a Global Navigation Satellite System (GNSS), for example a GPS satellite. Even when the image (e.g., as provided by the deep learning model) and the three-dimensional point cloud (e.g., LiDAR data) are collected by different vehicles and/or different devices, the GNSS synchronizes the model points and the 3D points.

A 3D point may include 3D real-world coordinates. An example format of the 3D points may include [Latitude, Longitude, Altitude, LiDAR intensity]. The latitude and longitude may be in degrees. The altitude may be in feet or meters above sea level or another reference point. The LiDAR intensity may be defined as the ratio of reflected laser beam strength to the original emitted laser beam strength, which may be multiplied by a scaling factor (e.g., 255) and rounded off to the nearest integer. For example, a sample 3D point may be [44.8170650604, 8.7780612886, 196.234975161, 56] corresponding to [Latitude, Longitude, Altitude, LiDAR intensity].

The 3D point may be concatenated with the corresponding timestamp to form a pose point. The corresponding timestamp may be timestamp generated at the same time (correlated with) the 3D point. An example format of the pose point may include [Timestamp, Latitude, Longitude, Altitude, LiDAR intensity]. For example, a sample pose point may be [1149246362539459, 44.8170650604, 8.7780612886, 196.234975161, 56].

The localization geometry generator 121 may be configured to temporally sort the data points. The 3D points, the model points, and/or the post points may be temporally sorted. The localization geometry generator 121 may utilize a specialized data structure such as a sorted dictionary. The timestamp field may be used the dictionary key and other fields may be dictionary values. The sorted dictionary maintains fast access by the dictionary key and simultaneously maintains the relative order of the dictionary keys. Once the detection points are sorted by timestamp, a series of detection points could be fast retrieved with respect to a specific drive of the vehicle. The specific drive may be defined as a complete road trip of the vehicle. The data structure design is optimized for fast retrieval. The amount of detection data points is very large.

The localization geometry generator 121 or the server 125 may provide the detection data point to a cloud service or another source of parallel computing that simultaneously processes all of a significant portion of the detection data points. The server 125 may send a set of detection data points for a particular roadway or a particular route taken by a collection vehicle to a cloud service for analysis. The following analysis is described as performed by the localization geometry generator 121 and server 125, which may be implemented by a cloud service including a cloud device.

The localization geometry generator 121 or the server 125 may convert the detection data points to a top-down view. The localization geometry generator 121 may access a predetermined set of detection data points, such as the detection data points corresponding to a specific drive may be retrieved from memory. The localization geometry generator 121 may remove the altitude from the pose points for the top-down view points, which may comprise [Timestamp, Latitude, Longitude, LiDAR intensity]. After detection data points from a specific drive are retrieved, the altitude information is discarded, and the following line connection procedure is only based on latitude and longitude. This effectively creates a top-down view.

There are two alternative embodiments of the line connection procedure. The line connection procedure may be a greedy algorithm that follows the rule of making the locally optimal choice at each decision point with the intent of finding a global optimum. The greedy algorithm may approximate the global optimal solution in a reasonable time (e.g., in an amount of time less than a threshold).

The line connection procedure may be performed by a first line connection procedure (e.g., a first greedy algorithm) to connect the top-down view connect the top-down view detection data points to form polylines. The polylines are dynamically chosen according to the characteristics of the source data, including geographically region, traffic conditions, curvature of roadways, or other factors.

Figure 12:
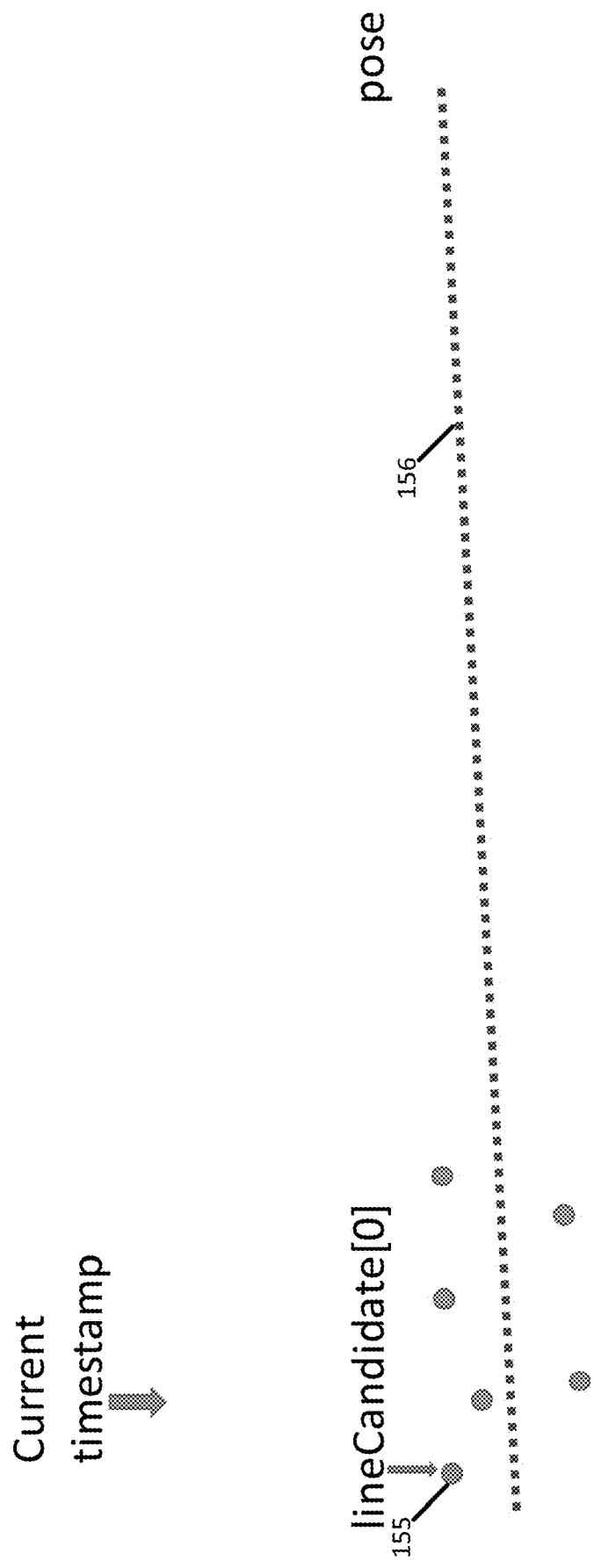
FIG. 12 illustrates a first stage of a first line connection procedure.

The first line connection procedure may include several stages. FIG. 12 illustrates a first stage of the first line connection procedure. The first stage initializes two types of two-dimensional (2D) empty lists: one type of list contains the desired output results, and the other type "lineCandidate" lists contains some temporary results called the line candidates. The desired output results include the finished or classified lane lines when they are complete, as described in more detail below. Initially, the lineCandidate list is empty, the current point (e.g., point 155) with the earliest timestamp is directly add to the lineCandidate as the initiation seed. The dotted line 156 illustrates the general direction of the trajectory of the collection vehicle. The dotted line 156 or corresponding trajectory may not be used in the first line connection procedure.

The first detection data point is added as the first element of the line candidate list. The example of FIG. 12 contains only a single line candidate list. Due to the co-occurrence property (e.g., specification lane lines may occur multiple times, as shown in FIG. 5, there are three solid lines and two striped lines) in which of the stripe shaped objects, multiple stripe shaped objects could be present. Therefore, multiple line candidate lists could be simultaneously present.

Figure 13:
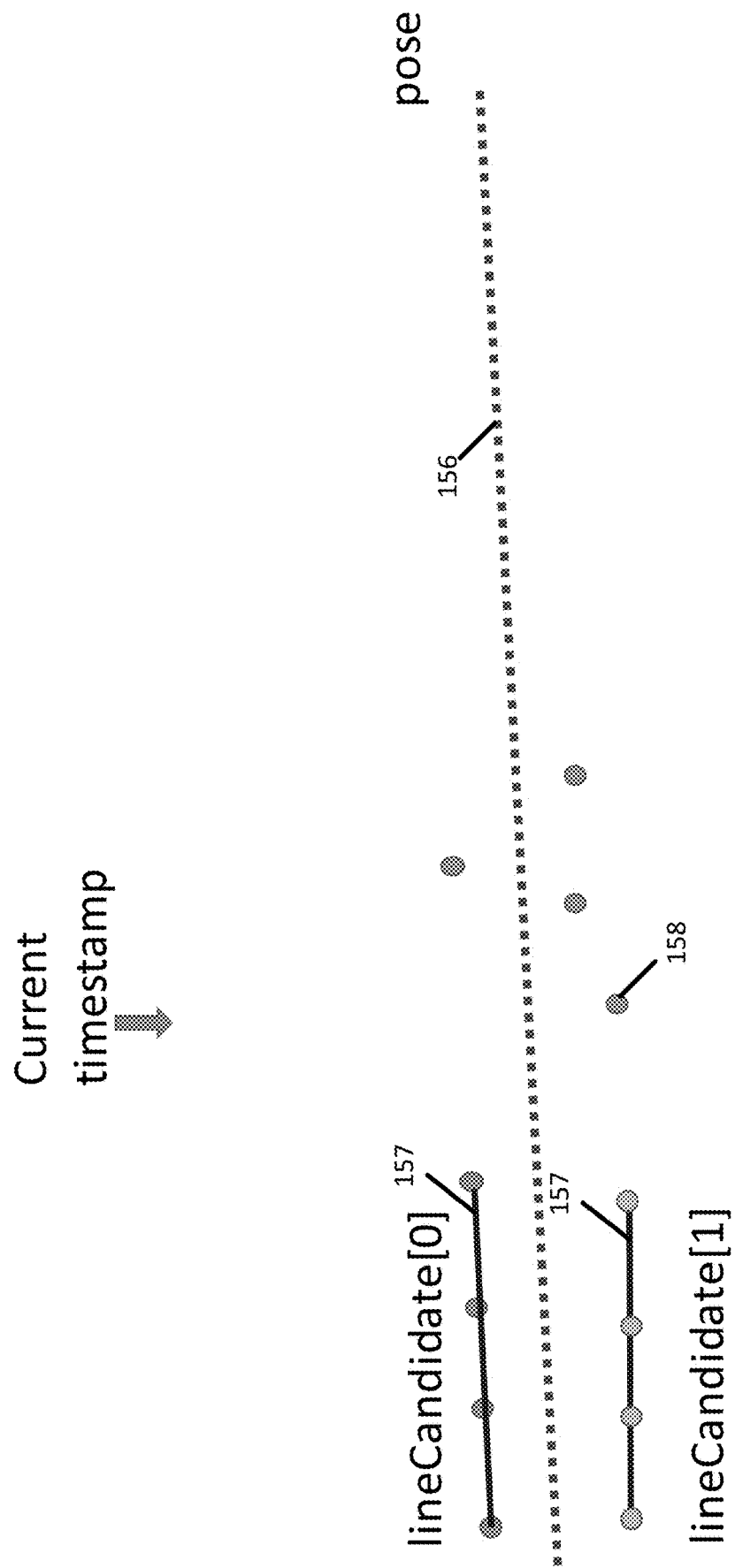
FIG. 13 illustrates a second stage of the first line connection procedure.

FIG. 13 illustrates a second stage of the first line connection procedure. The second stage performs one or more iterations with respect to timestamps. With regard to the timestamp in a monotonically increasing order, the first line connection procedure iterates through each detection data point. For the illustration purposes, two line candidate lists are included ("lineCandidate[0]" and "lineCandidate[1]"). As shown in FIG. 13 the lineCandidate[0] and lineCandidate[1] data structures include data points to form polylines 157. The construction of the polylines 157 is described with respect to the nest closest potential point 158.

Figure 14:
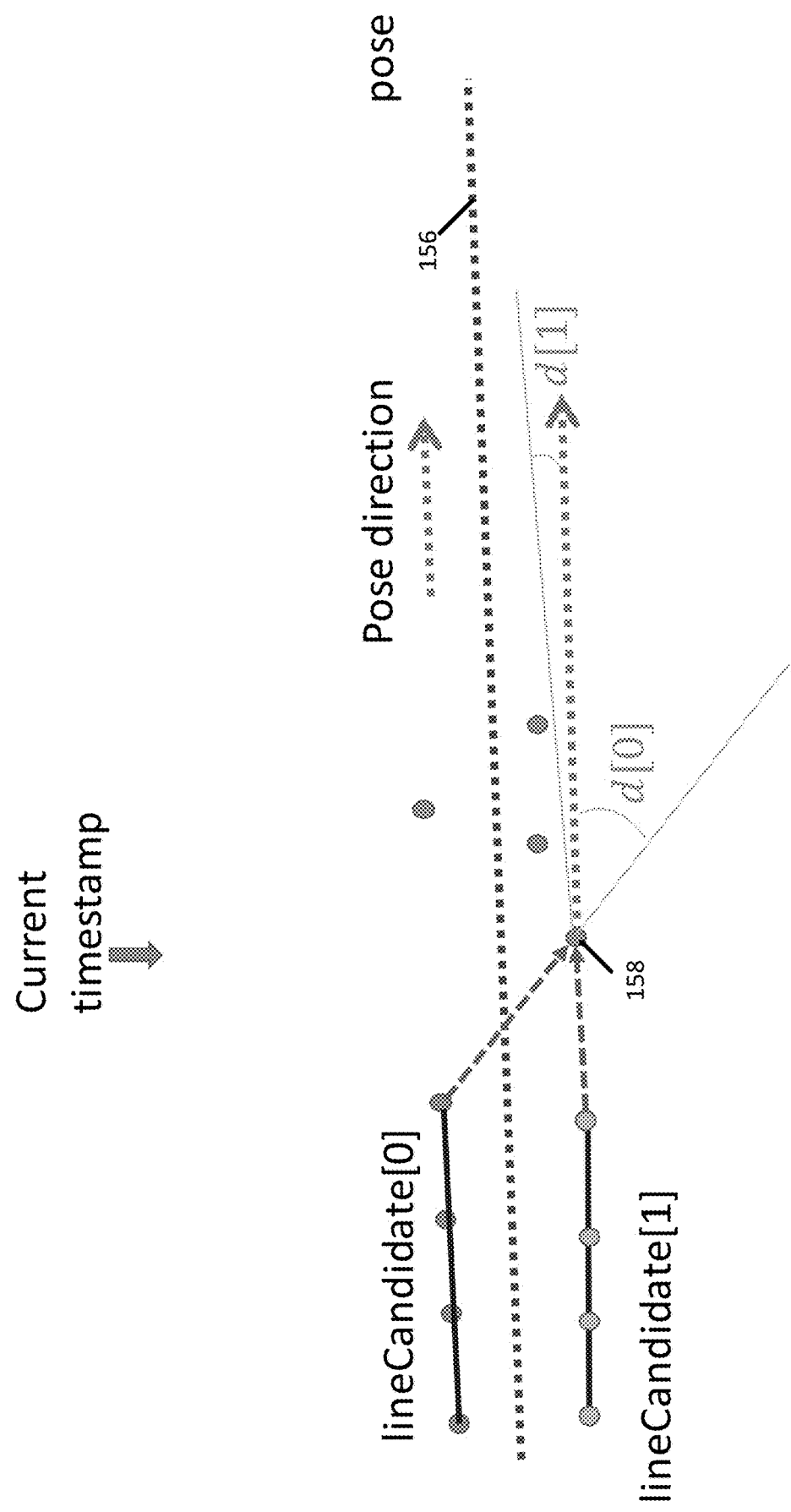
FIG. 14 illustrates a third stage of the first line connection procedure.

FIG. 14 illustrates a third stage of the first line connection procedure for polyline growth by maintaining direction. Both "lineCandidate[0]" and "lineCandidate[1]" may be extended, which is termed as "polyline growth". The basic strategy is to maintain the direction of each individual polyline. A direction of a polyline may be defined as the longest direction of a specific polyline.

Using the first line connection algorithm, the polyline growth is determined by a minimum deviation angle. The localization geometry generator 121 performs a determination of the minimum angle for each of the polylines 157. First, a nearest pose point 158 is located. Since pose points are consecutive and ordered by timestamps, the travel direction of the pose point can be determined (from a pose point with a smaller timestamp value to a one with a larger timestamp value). The travel direction indicates the traffic travel direction of the specific roadway, which is illustrated as the arrow labeled as "Pose direction".

Secondly, the nearest potential detection data point 158 is retrieved, and the deviation angles are calculated with respect to each of the line candidate lists. The deviation angles are obtained by connecting the last point in the each list (lineCandidate[0] and lineCandidate[1]) and the potential point 158, and measuring the deviation angles d[0] and d[1].

Figure 15:
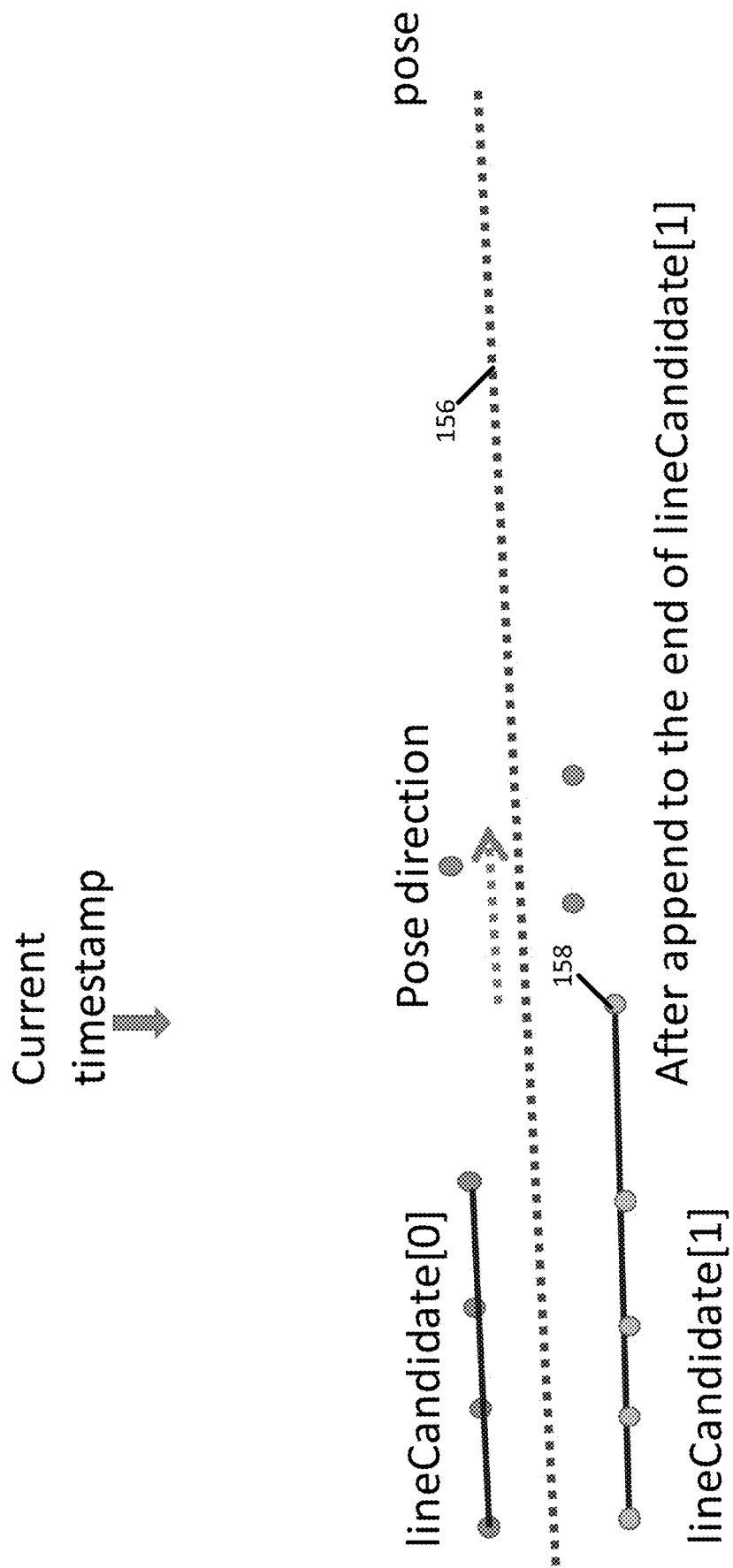
FIG. 15 illustrates a result of the third stage of the first line connection procedure.

If the deviation angles are less than a predefined threshold (e.g., 5 degrees, 10 degrees, or another angle), the potential point 158 will be used to extend the specific line candidate with the smallest deviation angle values (in the above example, lineCandidate[1]). Because the deviation angles are less than the predetermined threshold, and d[1] is less than d[2], the potential point 158 is appended to the end of lineCandidate[1], as illustrated by FIG. 15.

Figure 16:
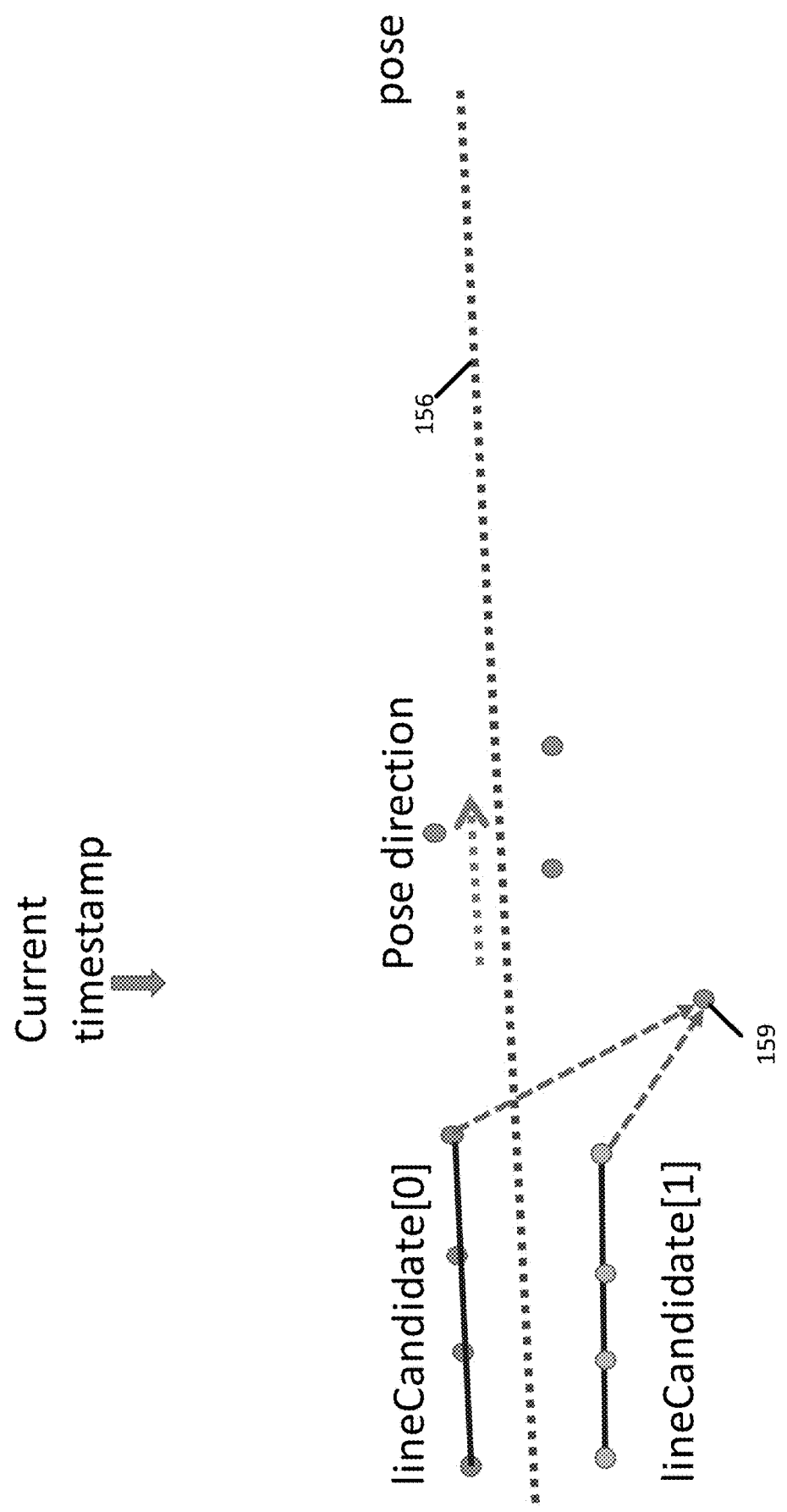
FIG. 16 illustrates an alternative for the third stage of FIG. 15.

FIG. 16 illustrates an alternative for the third stage of the first line connection procedure. In this case the deviation angles (e.g, first deviation angle from lineCandidate[0] to potential point 159 and second deviation angle from lineCandidate[1] to potential point 159) are larger. If all deviation angles are larger than the predefined threshold (e.g., 5 degrees, 10 degrees, or another angle), it is assumed a new striped shaped object has been detected. This potential point 159 is used to initialize a new line candidate list. Thus, the localization geometry generator 121 returns to the first stage for initialization, as described above. Thus, FIG. 16 illustrates that potential point 159 becomes the initial point of lineCandidate[2].

Figure 17:
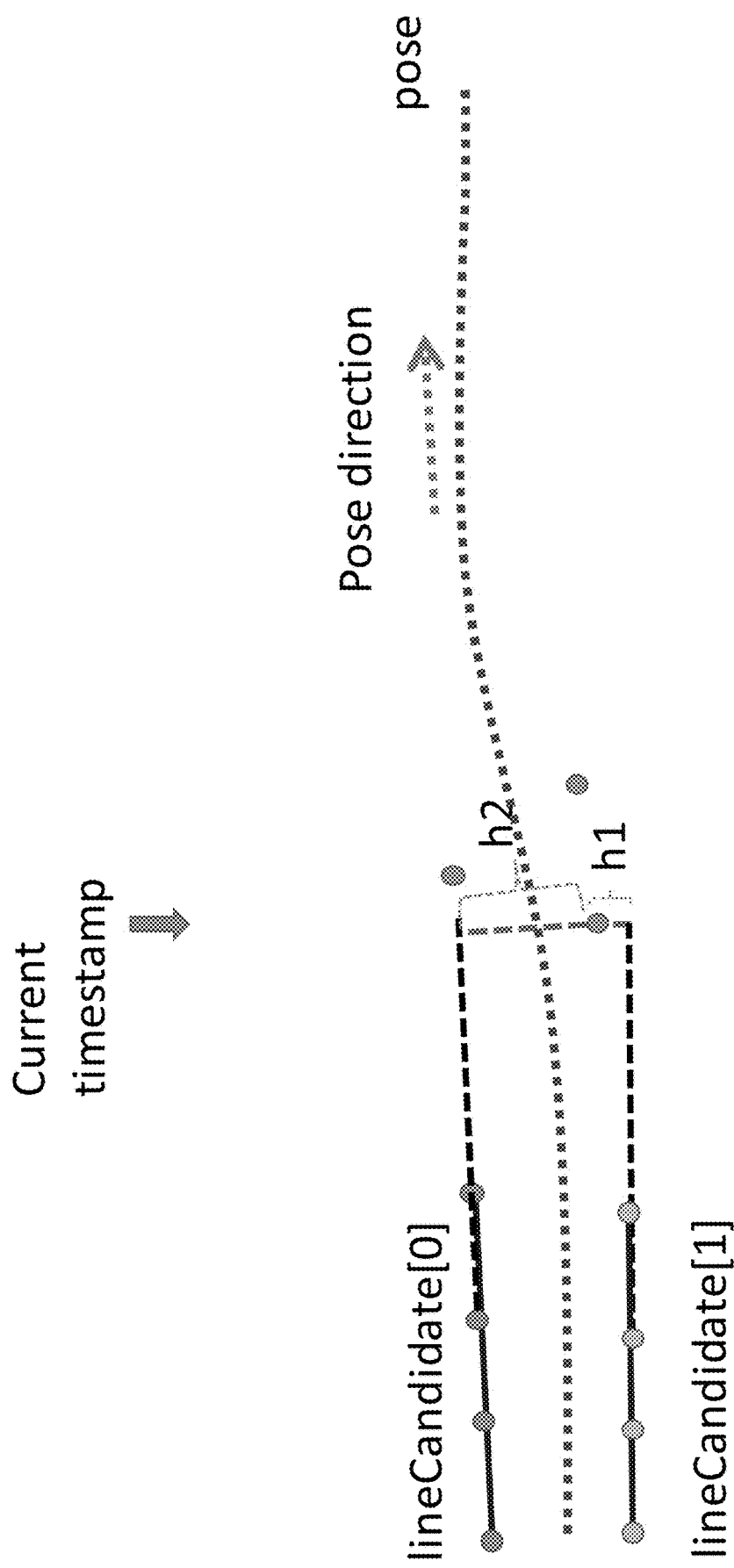
FIG. 17 illustrates a second stage of the second line connection procedure.

FIG. 17 illustrates the second line connection procedure (e.g., a second greedy algorithm). In the second line connection procedure, rather than deviation angles, the localization geometry generator 121 compares perpendicular distances from the line candidates to the potential point 159.

The localization geometry generator 121 calculates a line intersecting the points (or approximating the points) in the data structure for each of the line candidates. The localization geometry generator 121 calculates a perpendicular distance from the potential point 159 to the line for each of the line candidates. The perpendicular line may be the shortest distance between the potential point 159 to the line. The localization geometry generator 121 may determine a slope of each of the lines of the line candidates, calculate a negative reciprocal of the slope, and construct a line through the potential point 159 using the negative reciprocal slope. In the example shown in FIG. 17, the perpendicular distance is for lineCandidate[0] is h2 and the perpendicular distance for lineCandidate[1] is h1.

Figure 18:
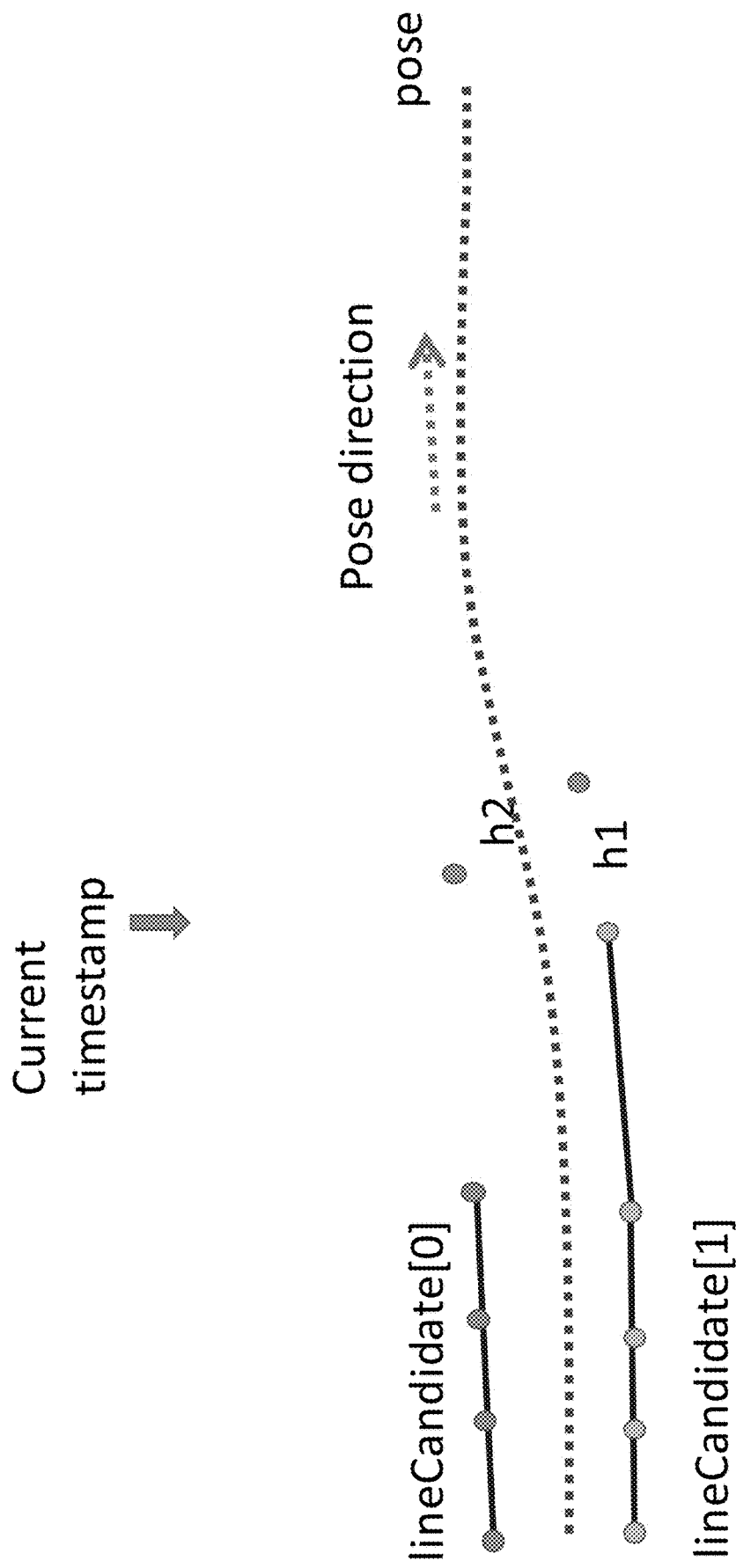
FIG. 18 illustrates a third stage of the second line connection procedure.

The localization geometry generator 121 compares the perpendicular distances for each of the line candidates. The localization geometry generator 121 selects the line candidate corresponding to the smaller, or smallest, perpendicular distance for the potential point 159. That is, because h1 is the smaller perpendicular distance, the potential point 159 is appended to the end of lineCandidate[1], as illustrated by FIG. 18.

The localization geometry generator 121 or otherwise server 125 may be configured to select the first line connection procedure or the second line connection procedure based on one or more factors. In one factor, the line connection procedure is selected based on the road attributes. Roads with more curves may analyzed using the second line procedure. The localization geometry generator 121 may determine a curvature factor for the roadway based a quantity of curves or a degree of the curves (e.g., how sharp the curves are). When the curvature factor exceeds a predetermined threshold, the localization geometry generator 121 selects the second line connection procedure. When the curvature factor is less than the predetermined threshold, the localization geometry generator 121 selects the first line connection procedure.

Figure 19:
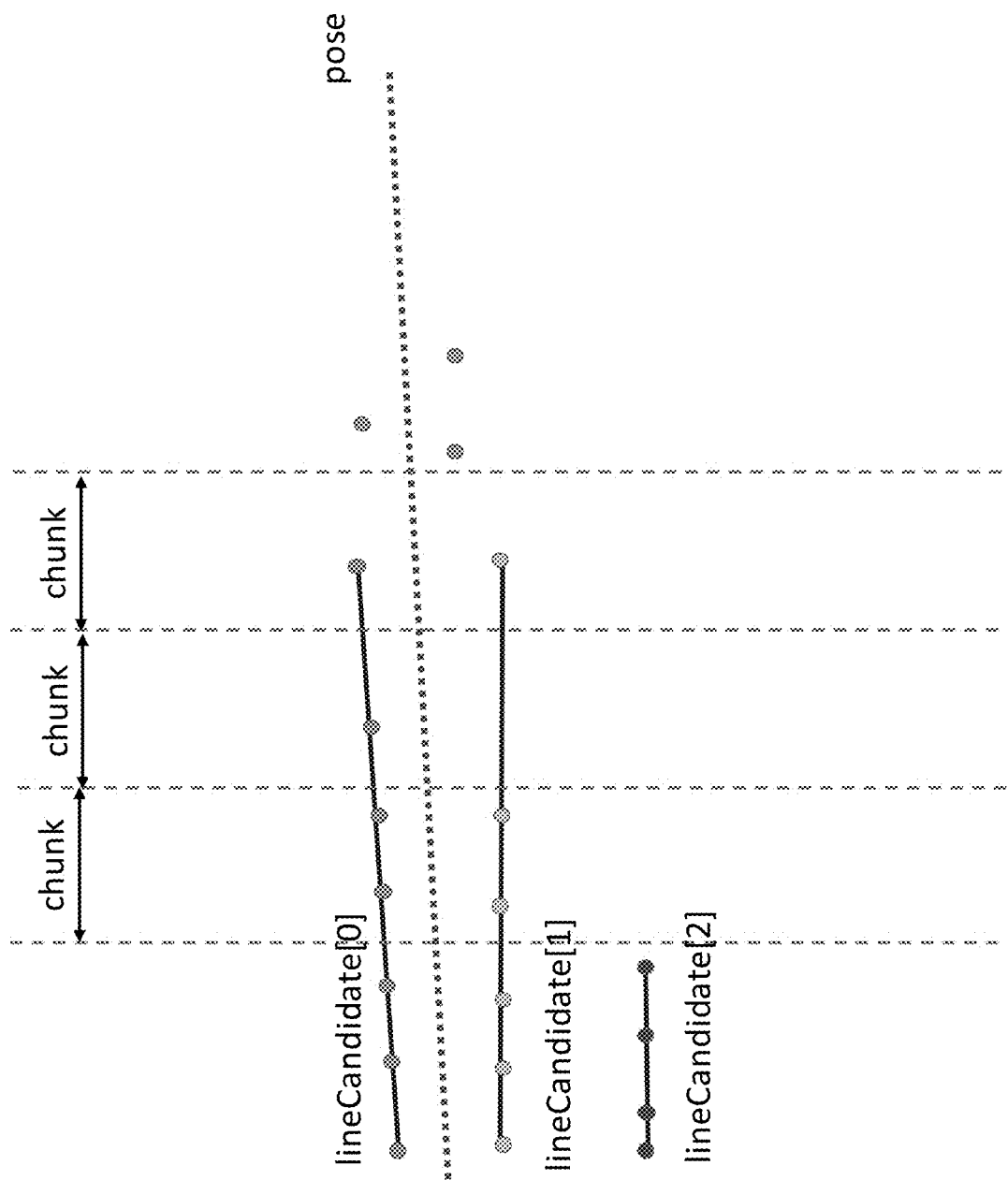
FIG. 19 illustrates an aging procedure for the stripe-shaped objects.

FIG. 19 illustrates an aging procedure for the stripe-shaped objects. The vertical dotted lines divide the roadway in the chunks. The chunks are the predetermined length used to analyze the road in section. Example chunks may be 12 meters, 20 meters, or another length. The length may be measured in the length of the road or a length of a tile or grid that may not be parallel to the road.

The localization geometry generator 121 may assign an age value to a line candidate. The age property describes how long (how far along the roadway) since a line candidate data structure has been modified. When the line candidates are not modified for some distance, because no new potential points are being added, the line candidate is classified as finished, finalized in memory, and cannot be appended further. The finished line candidate list is moved to the "desired output" lists.

The localization geometry generator 121 may designate an aging procedure by assigning, to each lineCandidate list, an integer property called the age property. All ages are initialized by zeros. After a lineCandidate extends past a chunk, the age property is either reset to 0 or increased by 1, depending on whether a new "potential point" is absorbed. If a lineCandidate is appended with at least one new potential point, the age value is reset to 0, otherwise age value is increased by 1.

The localization geometry generator 121 may analyze the data points in chunks 163, 164, and 165 in success from left to right. Prior to chunk 163 each of the line candidates were appended with points. In the analysis of line chunk 163, lineCandidate[0] and lineCandidate[1] were appended with points and their age values are set to 0, or remain at 0. LineCandidate[2], on the other hand, receives no points in chunk 163, which means the age value increase to 1. In the analysis of chunk 164, lineCandidate[0] receive a point and its age value stays at 0. LineCandidate[1] does not receive a point so its age value increases to 1, and lineCandidate[2] does not receive a point so its age value increases to 2. On each of these iterations, the localization geometry generator 121 compares the age value for each line candidate to a predetermined value (e.g., 2). When a line candidate has an age value that meets the predetermined value, the localization geometry generator 121 deems that line candidate as mature and/or classifies the line candidate as finished. A finished line candidate can no longer be appended with additional points. The localization geometry generator 121 may remove lineCandidate[2] from further analysis (e.g., for potential point 159) and append it to the "desired output" lists.

It is noted that sometimes a potential point 169 may appear to belong to a finished line candidate, such as lineCandidate[2] in FIG. 19, which is not eligible because it is aged out. However, if neither lineCandidate[0] or lineCandidate[1] qualify for potential point 169 because the perpendicular height or deviation angle is too large. Another line candidate, lineCandidate[3], is generated in a position near that of matured lineCandidate[2] and appended with potential point 169.

Figure 20:
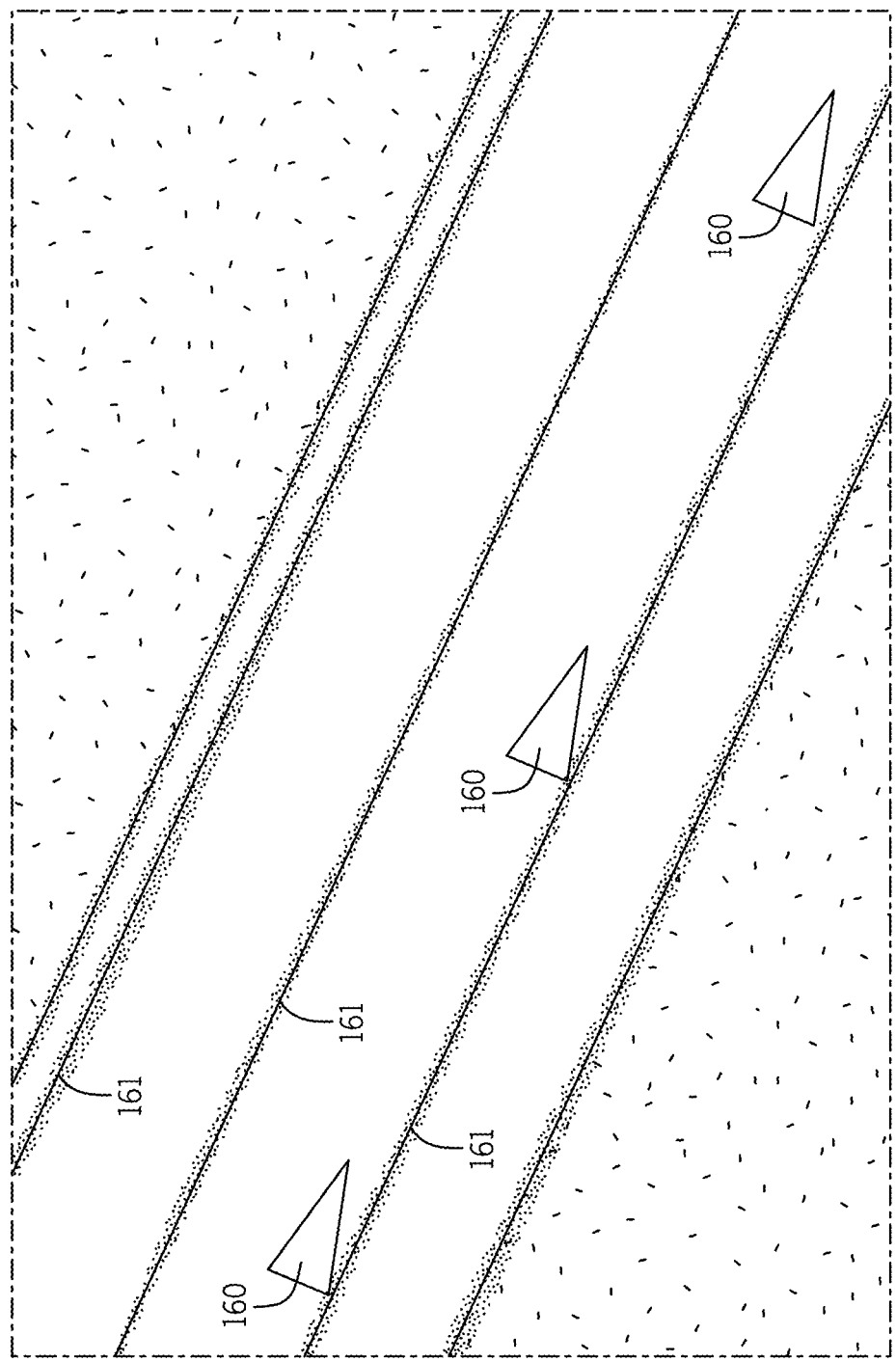
FIG. 20 illustrates an example line connection based on the stripe-shaped objects.

FIG. 20 illustrates an example line connection from a series of images based on the stripe-shaped objects. The roadway images have a limited view in the area near the collection vehicle, which may include only tens of meters of roadway in any one image. To build the high definition map 146 multiple images are analyzed in series and the resulting geometries are connected from image to image. FIG. 20 illustrates triangles 160 indicating the location of the collection vehicle where the series of images are collected. The geometries from the series of images are combined to form lane markings 161 across an area much larger than that depicted in any one image.

Figure 21:
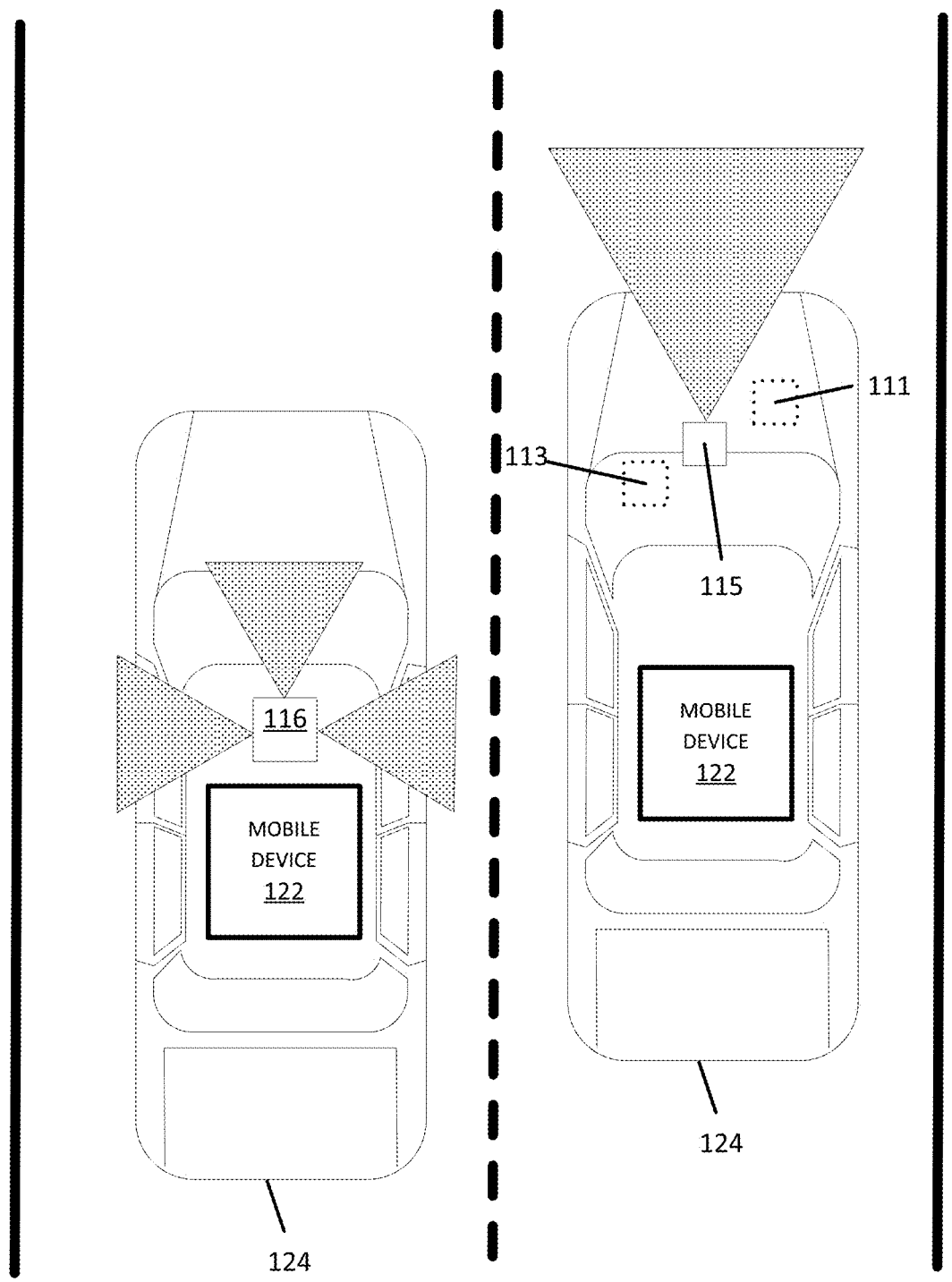
FIG. 21 illustrates example vehicles for collection data for generating geometries for stripe-shaped objects.

FIG. 21 illustrates example vehicles for collection data for generating geometries for stripe-shaped objects. A connected vehicle includes a communication device and an environment sensor array (e.g., corresponding to probe 101 and/or sensor 111) for reporting the surroundings of the vehicle 124 to the server 125. The connected vehicle may include an integrated communication device coupled with an in-dash navigation system. The connected vehicle may include an ad-hoc communication device such as a mobile device or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle. The sensor array may include multiple sensors. Example sensors include an optical distance system such as a LiDAR system 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera. The LiDAR system 116, an image capture system 115 may collect sensor data that describes whether or not the vehicle 124 is traveling in a tunnel, whether or not the sun is shining, whether or not the current weather includes precipitation, or other factors external to the vehicle 124.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor. The vehicle sensor 113 may include a microphone, an internal camera, or another sensor to detect the internal environment of the vehicle 124. Any vehicle may include any combination of the sensors. The sensors are shown in association with different vehicle for the ease of illustration.

The mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125, which may have been updated. The mobile device 122 is configured to perform a driving assistance function in response to the image and analysis and whether the at least one target region includes a pixel in common with the one or more stripe-shaped objects.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in response to detected objects or objects in the geographic database 123. The objects in the geographic database 123 may include one or more stripe-shaped objects generated according to the techniques described herein. The autonomous vehicle is configured to generate a driving command in response to the image and analysis and whether the at least one target region includes a pixel in common with the one or more stripe-shaped objects.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and/or objects in the geographic database 123. The objects in the geographic database 123 may include one or more stripe-shaped objects generated according to the techniques described herein.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle and/or objects in the geographic database 123. The objects in the geographic database 123 may include one or more stripe-shaped objects generated according to the techniques described herein.

Figure 22:
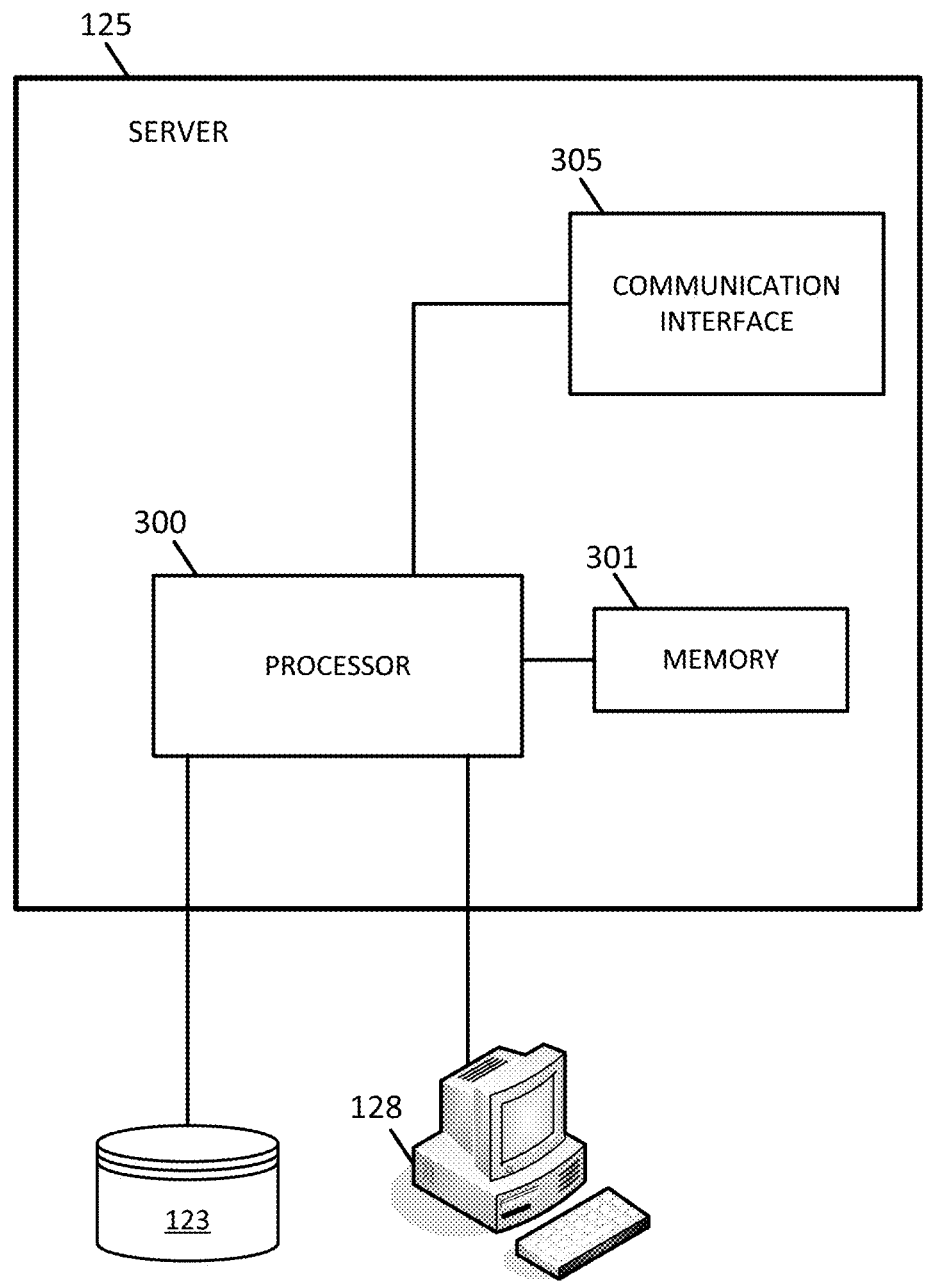
FIG. 22 illustrates an example server.
Figure 23:
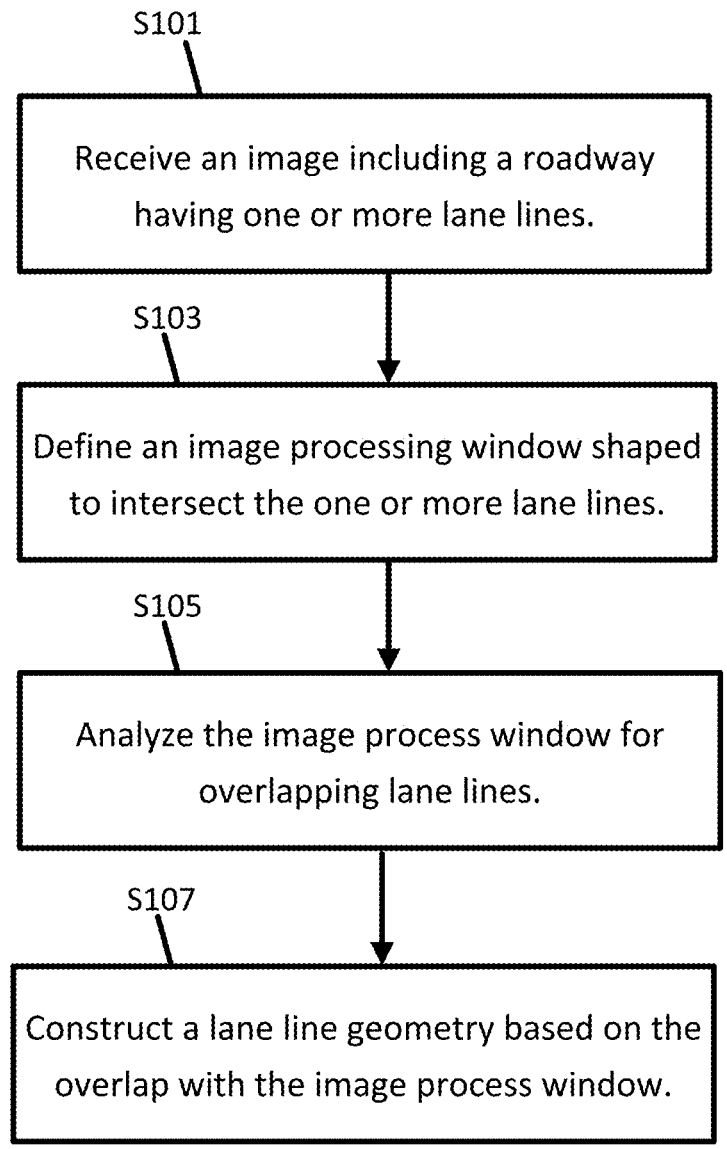
FIG. 23 illustrates an example flowchart for generating geometries for stripe-shaped objects.

FIG. 22 illustrates an example server 125, which may apply to the system of FIG. 1. The server 125 includes a processor 300, a communication interface 305, a memory 301, and a database 123. An input device (e.g., keyboard or personal computer) may be used to enter settings to the server 125. Example scanline settings include the locations of the groups of the scanlines (e.g., left-side, right-side, bottom, and/or top of the image), the dimensions of the scanlines, number of scanlines, the arrangement of the scanlines, and/or the spacing between scanlines. Example deep learning model settings include the type of model (e.g., neural network, classification and regression, or clustering), and/or parameters of the model (e.g., the number of layers and/or type of layers). Example lane marking settings may include the types of lane markings available, and/or the shapes or templates used for the types of lane markings. Example geometry detection settings may include the probability threshold for determining a lane marking exists and/or a confidence level interval for establishing a lane marking line that is fitted to the data points. Additional, different, or fewer components may be provided in the server 125. FIG. 23 illustrates an example flowchart for the operation of server 125. Additional, different, or fewer acts may be provided.

The geographic database 123 includes road segments, and at least one road segment associated with at least one road object attribute. The road object attribute may describe the type of road object (e.g., physical divider, lane line, or another object). The road object attribute may describe a relative location of the road object.

The memory 301 is configured to store received probe data. The memory 301 is configured to store image data collected along the roadway and distance data collected along the roadway.

At act S101, the processor 300 or the communication interface 305 is configured to receive an image including a roadway having one or more lane lines. The image may be collected by a camera of the mobile device 122, which may be a component of vehicle 124. The image may be made of pixels having pixel values for color, brightness, and size. The communication interface 305 is a means for receiving the image including the roadway.

At act S103, the processor 300 defines an image processing window shaped to intersect the one or more lane lines. The image processing window may be perpendicular to, or substantially perpendicular to, the likely direction of lane lines. The likely direction of lane lines may be in the direction of a vanishing point in the image or a direction of travel on the roadway. The image processing window may have dimensions including lengths or widths that are selected according to the expected type of lane line, the type of road, or the speed of the image collection device. The image processing window is correlated with multiple pixels of the image. That is the image processing window overlaps certain pixels in the image. The processor 300 may include circuitry or a module or an application specific controller as a means for defining the image processing window shaped to intersect the one or more lane lines.

At act S105, the processor 300 is configured to analyze the image process window to determine whether any of the one or more lane lines overlap the image process window. The analysis may include a deep learning technique based on a set of training images. The training images have known positions of lane lines. Through training, the processor 300 develops a relationship between the pixels values of the entire image and whether the portion of the image in the image processing window includes a lane line. The processor 300 includes circuitry or a module or an application specific controller as a means for analyzing the image process window to determine whether any of the one or more lane lines overlap the image process window.

At act S107, the processor 300 constructs a lane line geometry based on the overlap with the image process window. The processor 300 may correlate the lane lines detected in the image with other sensor data having a greater resolution and/or accuracy than the image. An example of sensor data that has a greater resolution and/or accuracy than the image is LiDAR data. From one or more overlapping pixels in the image processing window, the processor 300 determines the shape of the lane line object in the sensor data. That shape is then correlated back to the image to determine the outline of the lane line object, which is the lane line geometry. The processor 300 includes circuitry or a module or an application specific controller as a means for constructing a lane line geometry based on the overlap with the image process window.

Figure 24:
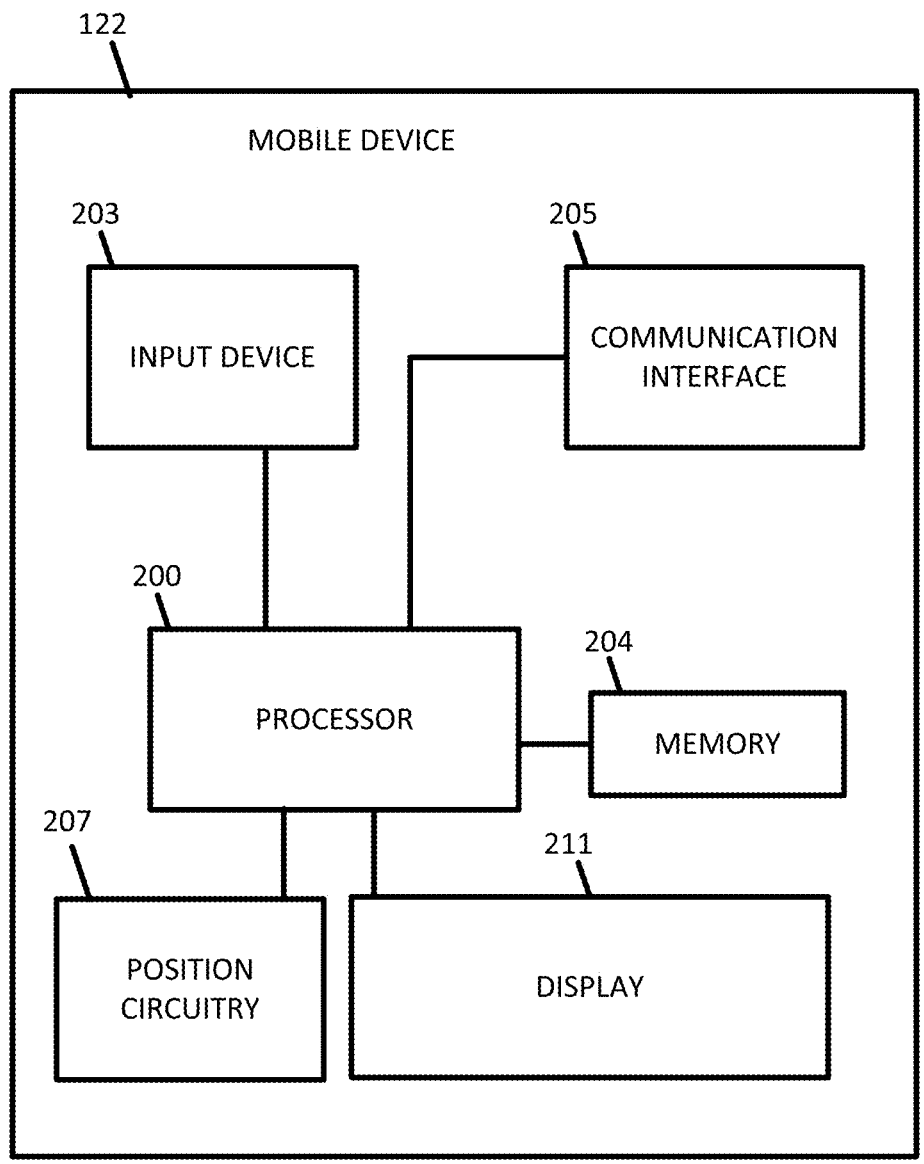
FIG. 24 illustrates an example mobile device.
Figure 25:
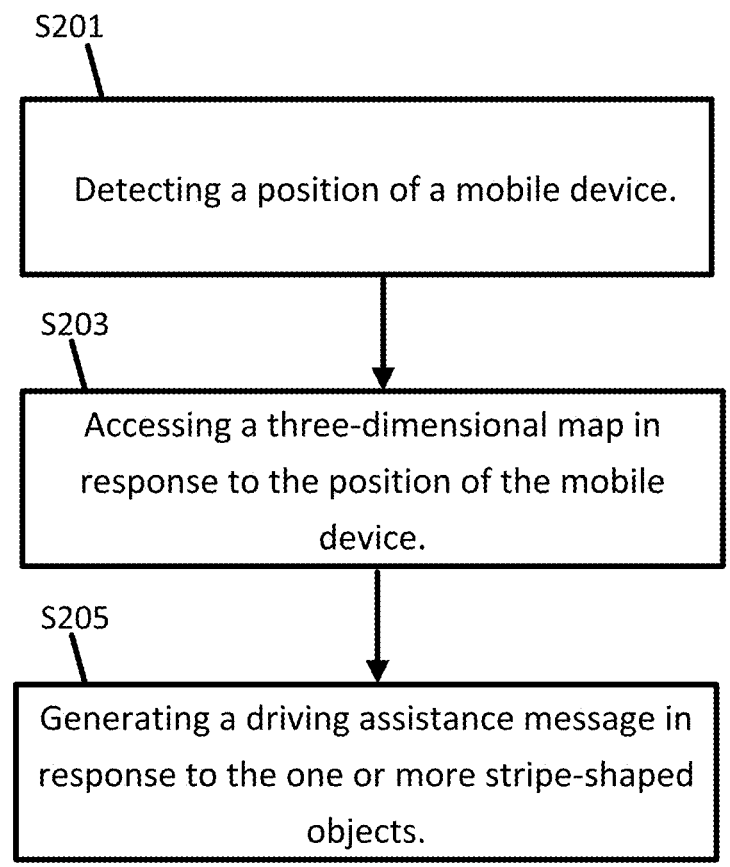
FIG. 25 illustrates an example flowchart for localization using the stripe-shaped objects.

FIG. 24 illustrates an exemplary mobile device 122 of the system of FIG. 1. The mobile device 122 includes a processor 200, a vehicle database 123, a memory 204, an input device 203, a communication interface 205, position circuitry 207, a display 211, and a camera 213. Additional, different, or fewer components are possible for the mobile device 122. FIG. 25 illustrates an example flowchart for the operation of mobile device 122. Additional, different, or fewer acts may be provided.

At act S201, the position circuitry 207, or the processor 200 through the position circuitry 207, detects a position of a mobile device 122. The position detector or position circuitry 207 is configured to determine a geographic position associated with the roadway. The position circuitry 207 is means for determining the position of the mobile device 122.

At act S203, the processor 200 accesses a three-dimensional map in response to the position of the map device for one or more stripe-shaped objects. The one or more stripe-shaped objects in the three-dimensional map is derived from at least one targeted region shaped to intersect the one or more stripe-shaped objects. The processor 200 includes circuitry or a module or an application specific controller as a means for accessing a three-dimensional map in response to the position of the map device for one or more stripe-shaped objects.

At act S205, the processor 200 generates a driving assistance message in response to the one or more stripe-shaped objects. The driving assistance message may be presented on display 211. The displayed message may instruct a driver than a lane line has been crossed or at risk of being crossed. The displayed message may instruct the driver to steer the vehicle back to the proper trajectory of the roadway. The driving assistance message may be a driving command for an autonomous driving system. The driving command may instruct the vehicle to steer left, steer right, or slow down to return the vehicle back to the proper trajectory of the roadway. The processor 200 includes circuitry or a module or an application specific controller as a means for generating the driving assistance message.

The mobile device 122 may generate a routing instruction based on the vehicle database 123. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some mobile device 122 show detailed maps on display 211 outlining the route, the types of maneuvers to be taken at various locations along the route, locations of certain types of features, and so on, any of which may include the stripe-shaped objects for lane marking or roadside objects.

The mobile device 122 may plan a route through a road system, or modify a current route through a road system based on the matched probe data. The route may extend from a current position of the mobile device or an origin to a destination through the road segment matched with the probe data. Possible routes may be calculated based on a Dijkstra method, an A-star algorithm or search, and/or other route exploration or calculation algorithms that may be modified to take into consideration assigned cost values of the underlying road segments. Various other aspects, such as distance, non-navigable areas, and/or restrictions, may be considered in addition to the cost to determine an optimum route.

Figure 26:
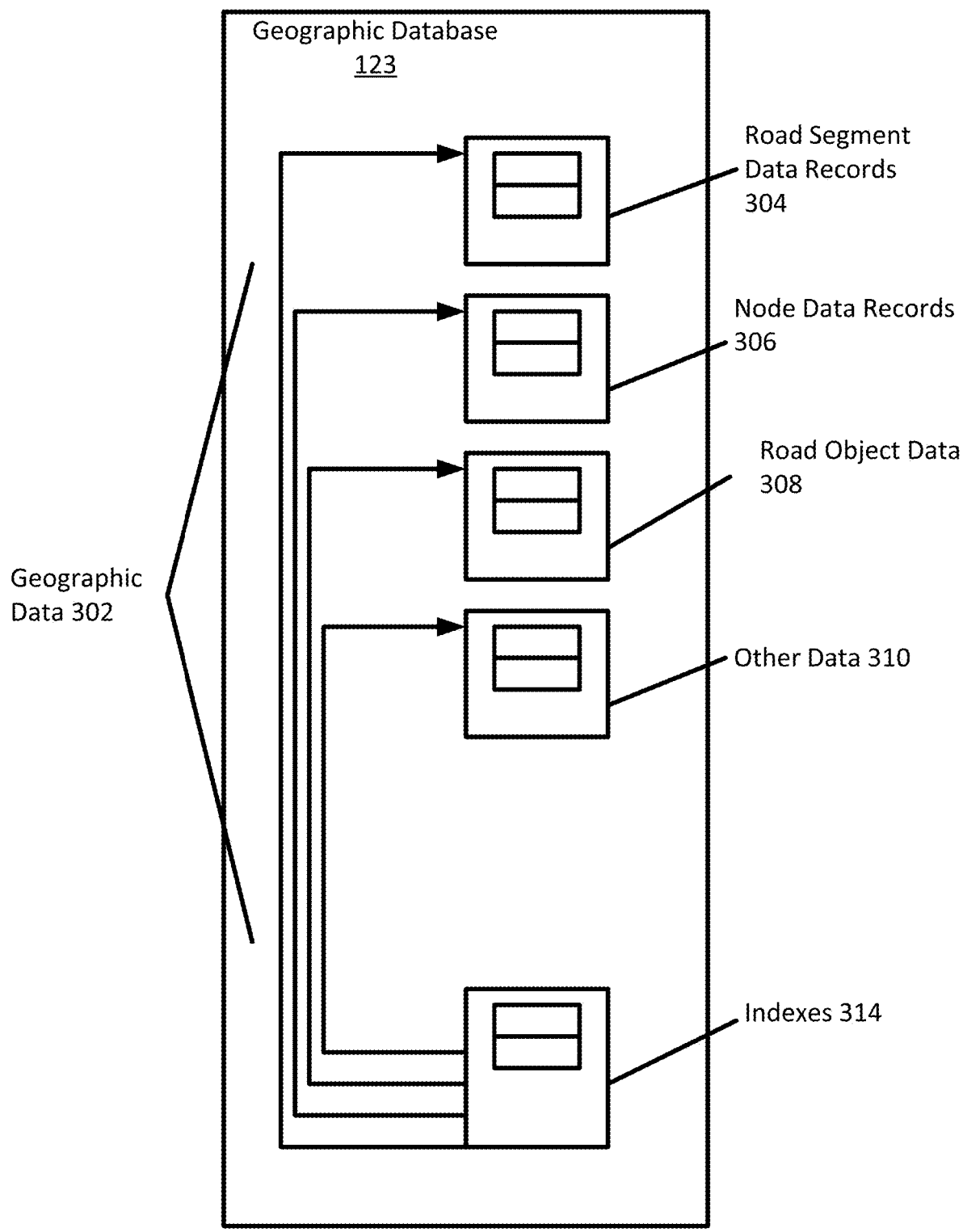
FIG. 26 illustrates an example geographic database.

In FIG. 26, the geographic database 123 may contain at least one road segment database record 304 (also referred to as "entity" or "entry") for each road segment in a particular geographic region. Any of the features of geographic database 123 may be applied to local databases 133. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include point of interest (POI) data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate road object data 308 (road object attributes) with a road segment in the segment data records 304 or a geographic coordinate. An index 314 may, for example, store data relating to one or more locations for the road object attribute 308 for each location. The road object attribute 308 may describe the type of road object (e.g., lane marking, dashed line marking, solid line marking, barrier, guardrail), the relative location of the road object, an angle from the direction of travel to the road object, and/or a distance between the road segment and the road object.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 relevant for this invention are: temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 27:
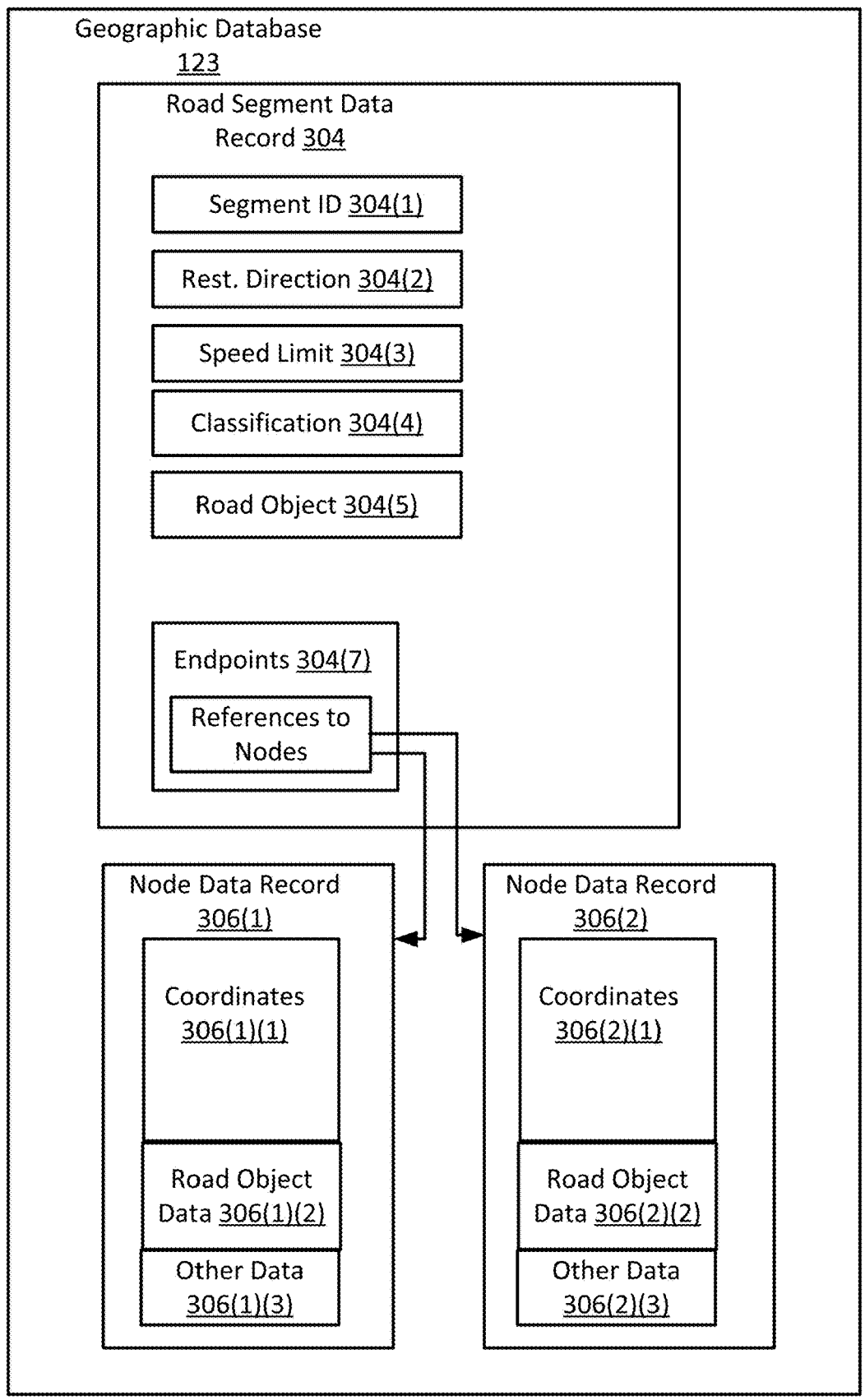
FIG. 27 illustrates an example geographic database.

FIG. 27 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes. The geographic database 123 may provide different display information relating to where open parking spots may exist, for example.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 27 also shows some of the components of a node data record 306 that may be contained in the geographic database 123. Each of the node data records 306 may have associated information (such as "attributes", "fields", etc.)

that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and road object data 306(1)(2) and 306(2)(2). The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the predicted parking availability data stored in the geographic database 123. Data including the The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The database 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment to streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for automatic localization geometry generation for stripe-shaped objects, the method comprising:
identifying an image including a roadway having one or more stripe-shaped objects;
determining, using a processor, at least one targeted region within the image, wherein the at least one targeted region is shaped to intersect the one or more stripe-shaped objects and overlaps a plurality of pixels in the image; and
performing, using the processor, an image analysis on the image to determine when the at least one target region having the plurality of pixels includes a pixel in common with the one or more stripe-shaped objects.

Embodiment 2

The method of embodiment 1, wherein the at least one targeted region includes a plurality of targeted regions spaced apart by a predetermined distance.

Embodiment 3

The method of any of embodiments 1 and 2, wherein the at least one targeted region is U-shaped.

Embodiment 4

The method of any of embodiments 1-3, wherein the one or more stripe-shaped objects include a ane marker, a road edge marker, a guardrail, a physical divider, or a combination thereof.

Embodiment 5

The method of any of embodiments 1-4, wherein the one or more stripe-shaped objects are parallel to the roadway.

Embodiment 6

The method of any of embodiments 1-5, wherein performing the image analysis on the image comprises:
applying the image to a multilayer neural network; and
receiving, from the multilayer neural network, an indication whether the at least one target region includes a pixel in common with the one or more stripe-shaped objects.

Embodiment 7

The method of any of embodiments 1-6, wherein the multilayer neural network is trained based on ground truth locations of the one or more stripe-shaped objects in a plurality of sets of image data associated with the roadway.

Embodiment 8

The method of any of embodiments 1-7. further comprising:
performing a driving assistance function in response to the image and analysis and whether the at least one target region includes the pixel in common with the one or more stripe-shaped objects.

Embodiment 9

The method of any of embodiments 1-8, further comprising:
generating a driving command in response to the image and analysis and whether the at least one target region includes the pixel in common with the one or more stripe-shaped objects.

Embodiment 10

The method of any of embodiments 1-9, wherein the at least one targeted region includes a plurality of target regions, the method further comprising:
identifying an intersection point with the one or more stripe-shaped for each of the plurality of target regions;
calculating an average of the intersection points for the plurality of target regions, wherein the pixel in common corresponds to the average of the intersection points.

Embodiment 11

The method of any of embodiments 1-10, further comprising:
projecting a location of the pixel in common to a three-dimensional point cloud; and
identifying a subset of data points in the three-dimensional point cloud corresponding to the location of the pixel in common.

Embodiment 12

The method of any of embodiments 1-11, further comprising:
identifying an area in the image corresponding to the subset of data points in the three-dimensional point cloud; and
performing a line connection algorithm using the area in the image and the subset of the data points in the three-dimensional point cloud.

Embodiment 13

An apparatus, configured to perform and/or control the method of any of embodiments 1-12 or comprising means for performing and/or controlling any of embodiments 1-12.

Embodiment 14

An apparatus, comprising at least one processor and at least one memory including computer program code for one or more programs, the at least one memory and the computer program code configured to, with the at least one processor, to perform and/or control the method of any of embodiments 1-12.

Embodiment 15

A computer program comprising instructions operable to cause a processor to perform and/or control the method of any of embodiments 1-12, when the computer program is executed on the processor.

Embodiment 16

A method comprising:
detecting a position of a mobile device;
accessing a three-dimensional map in response to the position of the mobile device for one or more stripe-shaped objects, wherein the one or more stripe-shaped objects in the three-dimensional map is derived from at least one targeted region shaped to intersect the one or more stripe-shaped objects; and
generating a driving assistance message in response to the one or more stripe-shaped objects.

Embodiment 17

An apparatus, configured to perform and/or control the method of embodiment 16 or comprising means for performing and/or controlling embodiment 16.

Embodiment 18

An apparatus, comprising at least one processor and at least one memory including computer program code for one or more programs, the at least one memory and the computer program code configured to, with the at least one processor, to perform and/or control the method of embodiment 16.

Embodiment 19

A computer program comprising instructions operable to cause a processor to perform and/or control the method of embodiment 16, when the computer program is executed on the processor.

We claim:

1. A method for automatic localization geometry generation for stripe-shaped objects, the method comprising:
identifying an image including a roadway having one or more stripe-shaped objects;
determining, using a processor, at least one targeted region within the image, wherein the at least one targeted region is shaped to intersect the one or more stripe-shaped objects and overlaps a plurality of pixels in the image;
applying the image including the at least one targeted region to a multilayer neural network;
receiving, from the multilayer neural network, an indication whether the at least one targeted region having the plurality of pixels includes at least one pixel in common with the one or more stripe-shaped objects;
constructing a geometry of the one or more stripe-shaped objects using the at least one pixel in common; and
modifying the geometry of the one or more stripe-shaped objects by correlating the at least one pixel in common with a subset of data points of a three-dimensional point cloud.

2. The method of claim 1, wherein the at least one targeted region includes a plurality of targeted regions spaced apart by a predetermined distance.

3. The method of claim 1, wherein the at least one targeted region is U-shaped.

4. The method of claim 1, wherein the one or more stripe-shaped objects include a lane marker, a road edge marker, a guardrail, a physical divider, or a combination thereof.

5. The method of claim 1, wherein the one or more stripe-shaped objects are parallel to the roadway.

6. The method of claim 1, wherein the multilayer neural network is trained based on ground truth locations of the one or more stripe-shaped objects in a plurality of sets of image data associated with the roadway.

7. The method of claim 1, further comprising:
performing a driving assistance function in response to the image and analysis and whether the at least one target region includes the pixel in common with the one or more stripe-shaped objects.

8. The method of claim 1, further comprising:
generating a driving command in response to the image and analysis and whether the at least one target region includes the pixel in common with the one or more stripe-shaped objects.

9. The method of claim 1, wherein the at least one targeted region includes a plurality of targeted regions, the method further comprising:
identifying an intersection point with the one or more stripe-shaped for each of the plurality of targeted regions; and
calculating an average of the intersection points for the plurality of targeted regions, wherein the pixel in common corresponds to the average of the intersection points.

10. The method of claim 1, wherein modifying the geometry of the one or more stripe-shaped objects by correlating the at least one pixel in common with the subset of data points of the three-dimensional point cloud further comprises:
identifying an area in the image corresponding to the subset of data points in the three-dimensional point cloud; and performing a line connection algorithm using the area in the image and the subset of the data points in the three-dimensional point cloud.

11. The method of claim 1, further comprising:
calculating a polyline based on the pixel in common with the one or more stripe-shaped object and a predetermined minimum deviation angle.

12. The method of claim 11, wherein the polyline extends from the pixel in common with the one or more stripe-shaped object to a subsequent pixel located within the predetermined minimum deviation angle, the subsequent pixel received from the multilayer neural network and included in the plurality of pixels in the at least one targeted region.

13. An apparatus for automatic localization geometry generation for stripe-shaped objects, the apparatus comprising:
a database configured to store an image including a roadway having one or more stripe-shaped objects; and
a server configured to determine localization geometry from at least one targeted region within the image, wherein the at least one targeted region is shaped to intersect the one or more stripe-shaped objects and includes a plurality of pixels, the server configured to apply the image including the at least one targeted region to a multilayer neural network for image analysis, wherein the image analysis determines when the at least one targeted region includes at least one pixel in common with the one or more stripe-shaped objects, constructs a geometry of the one or more stripe-shaped objects using the at least one pixel in common, and modifies the geometry of the one or more stripe-shaped objects through a correlation of the at least one pixel in common with a subset of data points of a three-dimensional point cloud.

14. The apparatus of claim 13, wherein the at least one targeted region includes a plurality of targeted regions spaced apart by a predetermined distance.

15. The apparatus of claim 13, wherein the one or more stripe-shaped objects are parallel to the roadway and include a lane marker, a road edge marker, a guardrail, a physical divider, or a combination thereof.

16. The apparatus of claim 13, further comprising:
a driving assistance device configured to perform a driving assistance function in response to the image and analysis and whether the at least one target region includes the pixel in common with the one or more stripe-shaped objects.

17. The apparatus of claim 16, wherein the driving assistance device is configured to generate a driving command in response to the image and analysis and whether the at least one target region includes the pixel in common with the one or more stripe-shaped objects.

18. An apparatus comprising at least one processor and at least one memory including computer program code being executable by the at least one processor to cause the apparatus to perform operations comprising:
identifying an image including a roadway having one or more stripe-shaped objects;
determining, using a processor, at least one targeted region within the image, wherein the at least one targeted region is shaped to intersect the one or more stripe-shaped objects and overlaps a plurality of pixels in the image;
applying the image including the at least one targeted region to a multilayer neural network;
receiving, from the multilayer neural network, an indication whether the at least one targeted region having the plurality of pixels includes at least one pixel in common with the one or more stripe-shaped objects;
constructing a geometry of the one or more stripe-shaped objects using the at least one pixel in common; and
modifying the geometry of the one or more stripe-shaped objects by correlating the at least one pixel in common with a subset of data points of a three-dimensional point cloud.

19. A non-transitory computer-readable medium storing computer program code, the computer program code when executed by a processor causing an apparatus to perform and/or control:
identifying an image including a roadway having one or more stripe-shaped objects;
determining, using a processor, at least one targeted region within the image, wherein the at least one targeted region is shaped to intersect the one or more stripe-shaped objects and overlaps a plurality of pixels in the image;
applying the image including the at least one targeted region to a multilayer neural network;
receiving, from the multilayer neural network, an indication whether the at least one targeted region having the plurality of pixels includes at least one pixel in common with the one or more stripe-shaped objects;
constructing a geometry of the one or more stripe-shaped objects using the at least one pixel in common; and
modifying the geometry of the one or more stripe-shaped objects by correlating the at least one pixel in common with a subset of data points of a three-dimensional point cloud.

* * * * *